United States Patent
Otsuki

(10) Patent No.: US 9,268,323 B2
(45) Date of Patent: Feb. 23, 2016

(54) NUMERICAL CONTROLLER WITH MACHINING CURVE CREATING FUNCTION

(71) Applicant: FANUC Corporation, Minamitsuru-gun, Yamanashi (JP)

(72) Inventor: Toshiaki Otsuki, Yamanashi (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 634 days.

(21) Appl. No.: 13/737,017

(22) Filed: Jan. 9, 2013

(65) Prior Publication Data

US 2013/0218323 A1 Aug. 22, 2013

(30) Foreign Application Priority Data

Feb. 20, 2012 (JP) ................. 2012-033897

(51) Int. Cl.
*G05B 19/19* (2006.01)
*G05B 19/4103* (2006.01)

(52) U.S. Cl.
CPC ............ *G05B 19/19* (2013.01); *G05B 19/4103* (2013.01); *G05B 2219/34096* (2013.01); *G05B 2219/34138* (2013.01)

(58) Field of Classification Search
CPC ............... G05B 19/19; G05B 19/4103; G05B 2219/34096; G05B 2219/34138
See application file for complete search history.

(56) References Cited

U.S. PATENT DOCUMENTS

| | | | | |
|---|---|---|---|---|
| 4,959,597 A | * | 9/1990 | Kawamura ......... | G05B 19/4103 318/568.15 |
| 5,028,855 A | * | 7/1991 | Distler .................. | G05B 19/41 318/573 |
| 5,043,644 A | * | 8/1991 | Sasaki ................ | G05B 19/4068 318/568.1 |
| 5,140,236 A | * | 8/1992 | Kawamura ......... | G05B 19/4103 318/568.1 |
| 5,214,591 A | * | 5/1993 | Sasaki ................. | G05B 19/182 318/573 |
| 5,563,484 A | * | 10/1996 | Otsuki ................. | G05B 19/41 318/568.15 |

(Continued)

FOREIGN PATENT DOCUMENTS

| | | |
|---|---|---|
| CN | 101493687 A | 7/2009 |
| DE | 60038577 T2 | 4/2009 |

(Continued)

OTHER PUBLICATIONS

Weck and Brecher, "Werkzeugmaschinen 4, Automatisierung von Maschinen und Anlagen," Issue 6, Chapter 7.1, Spline-Interpolation, pp. 307-312, Springer-Verlag, Berlin, Heidelberg 2006.

*Primary Examiner* — Ramesh Patel
(74) *Attorney, Agent, or Firm* — Drinker Biddle & Reath LLP

(57) ABSTRACT

Provided is a numerical controller having a machining curve creating function. A command point sequence is divided into a plurality of segments and a segment curve corresponding to each segment command point sequence is created. The segment curve is created so that a distance of the segment curve from the segment command point sequence is within a permissible value set in advance, and the maximum number of command points are included between a starting point and an ending point of the segment command point sequence. This process of segment curve creation is repetitively executed from the starting point to the ending point of the command point sequence to create a machining curve. Subsequently, the machining curve is interpolated and drive axes of a machine tool are moved to the interpolated positions on the machining curve.

10 Claims, 9 Drawing Sheets

(56) References Cited

U.S. PATENT DOCUMENTS

| | | | |
|---|---|---|---|
| 6,922,606 B1 * | 7/2005 | Yutkowitz | G05B 19/00 318/560 |
| 2002/0084763 A1 * | 7/2002 | Shibukawa | G05B 19/40937 318/569 |
| 2007/0250206 A1 * | 10/2007 | Otsuki | G05B 19/4103 700/189 |
| 2014/0046476 A1 * | 2/2014 | Walker | B21F 3/02 700/165 |

FOREIGN PATENT DOCUMENTS

| | | |
|---|---|---|
| EP | 0384925 A1 | 9/1990 |
| JP | H01-217607 | 8/1989 |
| JP | 2-113305 A | 4/1990 |
| JP | H04333105 A | 11/1992 |
| JP | 10-049215 A | 2/1998 |
| JP | 10-240328 A | 9/1998 |
| JP | 2007293478 A | 11/2007 |

* cited by examiner

```
N001  G05.1  Q1;
N002  X___  Y___  Z___  F___ ;
N003  X___  Y___  Z___ ;
...
N999  G05.1  Q0  X___  Y___  Z___;
```

NUMERICAL CONTROLLER WITH MACHINING CURVE CREATING FUNCTION

RELATED APPLICATION DATA

This application claims priority under 35 U.S.C. §119 and/or §365 to Japanese Application No. 2012-033897 filed Feb. 20, 2012, the entire contents of which are incorporated herein by reference.

BACKGROUND OF THE INVENTION

1. Field of the Invention

The present invention relates to a numerical controller that performs machining by creating a curve for machining (machining curve) based on a command point sequence obtained from a machining program for a machine tool having a plurality of drive axes including at least two linear axes, interpolating the machining curve, and driving the drive axes to the interpolated positions on the machining curve.

2. Description of the Related Art

Conventionally, with a numerical controller that controls a machine tool, a method of creating a curve or a straight line from a supplied point sequence and interpolating the curve or the straight line is known.

<1> Curve Creation 1-1. A spline curve when a starting point condition at a starting point and an ending point condition at an ending point of a command point sequence are specified Generally, when a point sequence $P_0, P_1, P_2, \ldots, P_n$, a first-derivative vector $P_0'$ as a starting point condition at a starting point of the point sequence, and a first-derivative vector $P_n'$ as an ending point condition of an ending point of the point sequence are given as shown in FIG. 1, a cubic function representing a cubic curve connecting the respective points so that first-derivative vectors and second-derivative vectors at each point are continuous is obtained as follows.

Expression (1) below holds for first-derivative vectors $(P_0', P_1', P_2', \ldots, P_n')^T$ at the respective points, where "T" denotes transposition. However, hereinafter, the sign will be omitted whenever self-evident. $t_1, t_2, \ldots, t_n$ denote differences in values of parameters (cubic function parameters t) of a created cubic function between the respective points $P_0, P_1, P_2, \ldots, P_n$ and is generally expressed as distances (curve lengths) between the respective points $P_0, P_1, P_2, \ldots, P_n$ of the created cubic function. However, a cubic function cannot be determined unless $P_0', P_1', P_2', \ldots, P_n'$ are determined, and the distances (curve lengths) between the respective points $P_0, P_1, P_2, \ldots, P_n$ of a curve representing a cubic function cannot be determined unless the cubic function is determined. Therefore, the distances (curve lengths) between the respective points $P_0, P_1, P_2, \ldots P_n$ are often approximated by linear distances between the respective points $P_0, P_1, P_2, \ldots, P_n$. For example, a linear distance between $P_0$ and $P_1$ is denoted by $t_1$, a linear distance between $P_1$ and $P_2$ is denoted by $t_2, \ldots,$ and a linear distance between $P_{n-1}$ and $P_n$ is denoted by $t_n$. Moreover, a first-derivative vector and a second-derivative vector respectively refer to values at each point (values of parameter t at each point) of a first-order differentiation and a second-order differentiation of a cubic function by the parameter t.

In this case, $P_0, P_1, P_2, \ldots, P_n$ and $P_0', P_1', P_2', \ldots, P_n'$ are vectors having elements corresponding to at least two linear axes. Depending on machine construction, the vectors may have elements of third, fourth, ... linear axes or elements of rotational axes in addition to the two linear axes.

$$\begin{bmatrix} 1 & 0 & \ldots & \ldots & \ldots & \ldots & 0 \\ t_2 & 2(t_1+t_2) & t_1 & 0 & \ldots & \ldots & 0 \\ 0 & t_3 & 2(t_2+t_3) & t_2 & 0 & \ldots & 0 \\ \ldots & \ldots & \ldots & \ldots & \ldots & \ldots & \ldots \\ 0 & \ldots & \ldots & 0 & t_n & 2(t_{n-1}+t_n) & t_{n-1} \\ 0 & \ldots & \ldots & \ldots & \ldots & 0 & 1 \end{bmatrix} \begin{bmatrix} P_0' \\ P_1' \\ P_2' \\ \ldots \\ P_{n-1}' \\ P_n' \end{bmatrix} = \begin{bmatrix} P_0' \\ \frac{3}{t_1 t_2}(t_1^2(P_2-P_1)+t_2^2(P_1-P_0)) \\ \frac{3}{t_2 t_3}(t_2^2(P_3-P_2)+t_3^2(P_2-P_1)) \\ \ldots \\ \frac{3}{t_{n-1}t_n}(t_{n-1}^2(P_n-P_{n-1})+t_n^2(P_{n-1}-P_{n-2})) \\ P_n' \end{bmatrix} \quad (1)$$

Therefore, since $P_0', P_n', P_0, P_1, P_2, \ldots, P_n$ are given by Expression (1) above and $t_1, t_2, \ldots, t_n$ can be derived from $P_0, P_1, P_2, \ldots, P_n$, $P'=(P_0', P_1', P_2', \ldots, P_n')^T$ can be determined. In other words, if Expression (1) is represented by Expression (2) below, then P' can be determined as represented by Expression (3).

$$M*P'=B \quad (2)$$

$$P'=M^{-1}*B \quad (3)$$

Once P' can be determined, a function of a cubic curve between the respective points can be derived from $P_0, P_1, P_2, \ldots, P_n$. In other words, a function $f_i(t)$ (i=0, 1, 2, ..., n-1; $0 \le t \le t_{i+1}$) of a cubic curve between $P_i$ and $P_{i+1}$ which is expressed as represented by Expression (4) below can be derived from $P_i, P_{i+1}, P_i', P_{i+1}'$. Therefore, from command point sequence positions $(P_0, P_1, P_2, \ldots, P_n)$, a starting point condition (in this case, $P_0'$), and an ending point condition (in this case, $P_n'$), a function representing a cubic curve between the respective points such that first-derivative vectors and second-derivative vectors at each point are continuous can be derived. $Af_i, Bf_i, Cf_i, Df_i$ are coefficients of the function $f_i(t)$. The coefficients and the function $f_i(t)$ are vectors having elements corresponding to the number of axes in a similar manner to $P_0, P_1, P_2, \ldots, P_n$.

$$f_i(t)=Af_i*t^3+Bf_i*t^2+Cf_i*t+Df_i \quad (4)$$

$f_i(t)$ may be determined as follows. When $f_i(t)$ is expressed as represented by Expression (4) above, $f_i'(t)$ may be expressed as represented by Expression (5) below. Therefore, Expression (6) holds, and by solving Expression (6) to derive $Af_i, Bf_i, Cf_i,$ and $Df_i$, the function $f_i(t)$ can be determined.

$$f_i'(t)=3*Af_i*t^2+2*Bf_i*t+Cf_i \quad (5)$$

$$f_i(0)=Df_i=P_i$$

$$f_i(t_{i+1})=Af_i*t_{i+1}^3+Bf_i*t_{i+1}^2+Cf_i*t_{i+1}+Df_i=P_{i+1}$$

$$f_i'(0)=Cf_i=P_i'$$

$$f_i'(t_{i+1})=3*Af_i*t_{i+1}^2+2*Bf_i*t_{i+1}+Cf_i=P_{i+1}' \quad (6)$$

A group of cubic curves determined in this manner is referred to as a spline curve. Since first-derivative vectors and second-derivative vectors at each point of a spline curve are continuous, a smooth machining shape and a smooth operation with continuous acceleration of each drive axis are obtained.

However, this method requires calculations be performed by reading in all command point sequence positions ($P_0$, $P_1$, $P_2$, ..., $P_n$). As the number of points constituting the command point sequence increases, the scale of matrix calculation becomes enormous and necessitates a large memory region and a long computation time.

Moreover, while a condition that $P_0'$ and $P_n'$ are specified has been adopted above, it is known that an expression approximately similar to Expression (1) above may be derived by adopting the following conditions. As described above, a condition at $P_0$ is referred to as a starting point condition and a condition at $P_n$ is referred to as an ending point condition.

Second-derivative vectors at $P_0$ and $P_n$ are 0. That is, $P_0''=0$ and $P_n''=0$.

$P_0'$ is specified, and $P_n''=0$.

Let $P_0''=0$, and $P_n'$ is specified.

Therefore, even when conditions such as given above are adopted, a function $f_i(t)$ ($i=0, 1, 2, ..., n-1$; $0 \le t \le t_{i+1}$) of a cubic curve between $P_i$ and $P_{i+1}$ can be determined in an approximately similar manner.

1-2. Creating a curve of a cubic function that sequentially connects points constituting a command point sequence A method disclosed in Japanese Patent Application Laid-open No. 2-113305 (corresponding to U.S. Pat. No. 5,140, 236) is a method of sequentially determining cubic expressions between points by deriving a first-derivative vector from a predetermined number of points including a starting point, deriving a cubic expression between the starting point and a next point based on coordinate values of predetermined points including the starting point, an end-point condition of the starting point, and the first-derivative vector, determining a spline curve between the starting point and a point subsequent to the starting point, and adding a new next point in place of the starting point. According to this method, a cubic spline curve is created without having to read in all points constituting a command point sequence. Although this method is advantageous in that a practically acceptable spline curve can be obtained by sequentially reading in points that constitute a command point sequence without increasing error from the theoretical spline curve described in "<1> Curve creation, 1-1" above, the method is problematic in that (a) since a cubic spline curve is sequentially created between points while reading in points that constitute a command point sequence, if intervals between the points are small, a capacity of a numerical controller for creating and interpolating a cubic spline curve becomes insufficient and the numerical controller decelerates movements of axes, and (b) if positions of the command point sequence are varied due to error with respect to a target curve, the created curve ends up being similarly varied.

<2> Thinning Out

Japanese Patent Application Laid-open No. 10-49215 discloses a method of performing straight-line approximation on a command point sequence and thinning-out points that correspond to approximated points. This method is problematic in that, since the command point sequence is approximated by a straight line, the approximated point sequence does not have a smooth shape.

<3> Correcting Command Point Positions

Japanese Patent Application Laid-open No. 10-240328 discloses a method of correcting positions of command points within a range of a permissible value so that the command points line up in a smooth manner. With this method, when a point sequence having small intervals between command points is commanded, processing capacity may become insufficient and deceleration may occur. Since the method of correcting command point positions involves creating an curve for approximation from several consecutive points (for example, five points) and correcting command point positions toward the curve, when positions of a command point sequence that is an approximated curve creation object have similar errors with respect to a target curve such as shown in FIG. 3, a correction that approximates the target curve cannot be performed due to the effect of the errors. In FIG. 3, tips of arrows depicting respective created curves indicate corrected positions of a command point sequence.

SUMMARY OF THE INVENTION

In consideration thereof, it is an object of the present invention to provide a numerical controller with a machining curve creating function which is capable of creating a single cubic curve (segment curve) corresponding to the maximum number of command points, connecting a plurality of such cubic curves (segment curves) to create a curve for machining (machining curve), interpolating the machining curve, and performing machining with a machine tool by driving a plurality of drive axes (including at least two linear drive axes) of the machine tool to the interpolated positions of the machining curve.

The present invention relates to a numerical controller with a machining curve creating function which is capable of creating a single cubic curve (segment curve) corresponding to the maximum number of command points, connecting a plurality of such cubic curves (segment curves) to create a machining curve that is a curve for machining, interpolating the machining curve, and performing machining by driving the drive axes to the interpolated positions on the machining curve, wherein respective cubic curves (segment curves) are connected to each other so that second-derivative vectors of cubic functions that represent the respective cubic curves (segment curves) are "continuous", a machining curve is created as a group of cubic curves (spline curves) created in this manner, and creation of such a machining curve is performed without reading in all points constituting a command point sequence (refer to FIG. 4). The term "continuous" as used herein means practically continuous and not theoretically continuous.

The numerical controller with a machining curve creating function according to the present invention performs machining by creating a machining curve that is a curve for machining based on a command point sequence obtained from a machining program for a machine tool having a plurality of drive axes including at least two linear axes, interpolating the machining curve, and driving the drive axes to the interpolated positions on the machining curve. In addition, the numerical controller comprises: a segment curve creating unit which divides the command point sequence into a plurality of segments, and creates a segment curve that is a curve corresponding to a segment command point sequence of each of the segments, so that a distance of the segment curve from the segment command point sequence is within a permissible value set in advance and a maximum number of command points are included between a segment starting point that is a starting point of the segment command point sequence and a segment ending point that is an ending point of the segment command point sequence; and a machining curve creating unit which creates the machining curve by repetitively executing the process of the segment curve creating unit from a starting point to an ending point of the command point sequence. Subsequently, the machining curve is interpolated and the drive axes are driven so as to move to the interpolated positions on the machining curve.

With respect to a segment command point sequence which is the command point sequence in a segment that starts at the starting point of the command point sequence, the segment curve creating unit is capable of : determining a segment starting point vector and a segment ending point vector, based on the starting point, a starting point condition that is a condition for the starting point, a segment ending point that is an ending point of the segment command point sequence, and a command point sequence constituted by a predetermined number of points after the segment ending point, as first-derivative vectors of the machining curve at the starting point and the segment ending point; creating the segment curve from the starting point, the segment starting point vector, the segment ending point, and the segment ending point vector; creating a first segment curve so that a distance of the first segment curve from the segment command point sequence is within a permissible value set in advance and a maximum number of command points are included between the starting point and the segment ending point; after creating the first segment curve, with respect to a segment command point sequence in a segment subsequent to the command ending point of the command point sequence, setting a segment ending point preceding the segment as a new segment starting point, setting a segment ending point vector preceding the segment as a new segment starting point vector, and setting an ending point of the segment command point sequence as a new segment ending point; determining a new segment ending point vector as a first-derivative vector of the machining curve at the segment ending point based on the new segment starting point, the new segment starting point vector, the new segment ending point, and a command point sequence constituted by a predetermined number of points after the new segment ending point; creating the segment curve from the new segment starting point, the new segment starting point vector, the new segment ending point, and the new segment ending point vector; and creating the segment curve so that a distance of the machining curve from the segment command point sequence is within a permissible value set in advance and a maximum number of command points are included between the segment starting point and the segment ending point.

According to the starting point condition, a tangential direction at a starting point of an arc connecting the starting point, a second point, and a third point of the command point sequence may be set as a first-derivative vector of the machining curve, or a tangential direction at a starting point of a quadratic curve connecting the starting point, the second point, and the third point of the command point sequence may be set as a first-derivative vector of the machining curve, or a tangential direction at a starting point of a straight line connecting the starting point and the second point of the command point sequence may be set as a first-derivative vector of the machining curve.

According to the starting point condition, a second-derivative vector of the machining curve at a starting point of the command point sequence may be set to zero.

Including the maximum number of command points between the segment starting point and the segment ending point can be realized by identifying, while increasing or reducing the number of skips ns, a maximum ns such that all of the following hold:

$$|Q_1 - P_{s(k)+1}| \leq Tol$$

$$|Q_2 - P_{s(k)+2}| \leq Tol$$

...

$$|Q_{ns-1} - P_{s(k)+ns-1}| \leq Tol.$$

The command point sequence may be a point sequence of command points commanded by a machining program or a point sequence produced by performing smoothing on a point sequence of command points commanded by the machining program.

According to the present invention, a numerical controller with a machining curve creating function can be provided which is capable of creating a single cubic curve (segment curve) corresponding to the maximum number of command points, connecting a plurality of such cubic curves (segment curves) to create a curve for machining (machining curve), interpolating the machining curve, and performing machining with a machine tool by driving a plurality of drive axes (including at least two linear drive axes) of the machine tool to the interpolated positions of the machining curve.

BRIEF DESCRIPTION OF THE DRAWINGS

These and other objects and features of the present invention will become apparent when the following description of preferred embodiments of the present invention is considered in connection with the drawings, in which.

DESCRIPTION OF THE PREFERRED EMBODIMENTS

Figure 1:
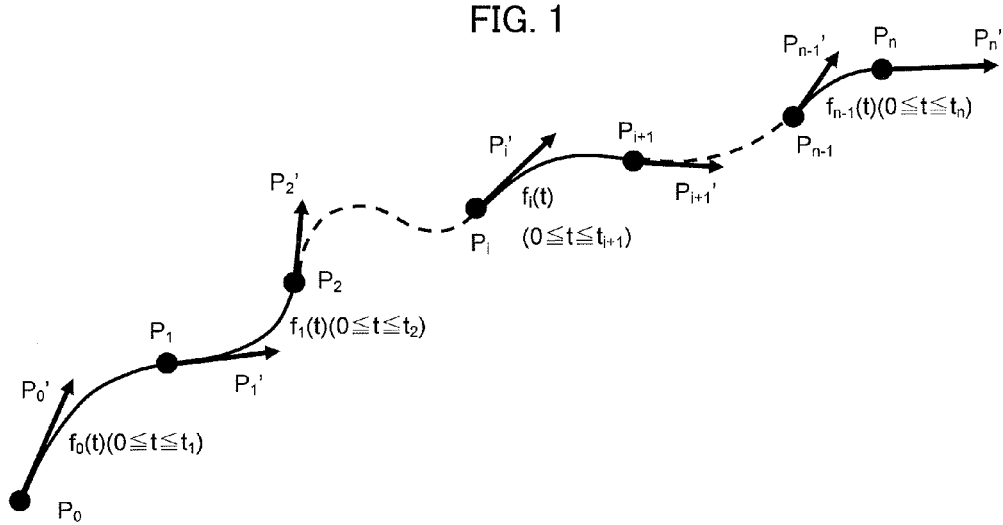
FIG. 1 is a diagram illustrating examples of a command point sequence and curve creation according to conventional art.
Figure 2:
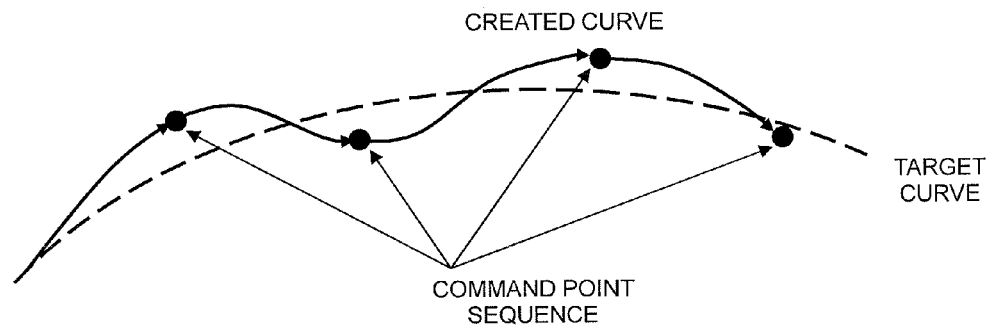
FIG. 2 is a diagram illustrating that a variation due to an error in command point sequence positions with respect to a target curve results in a variation in a created curve according to conventional art.
Figure 3:
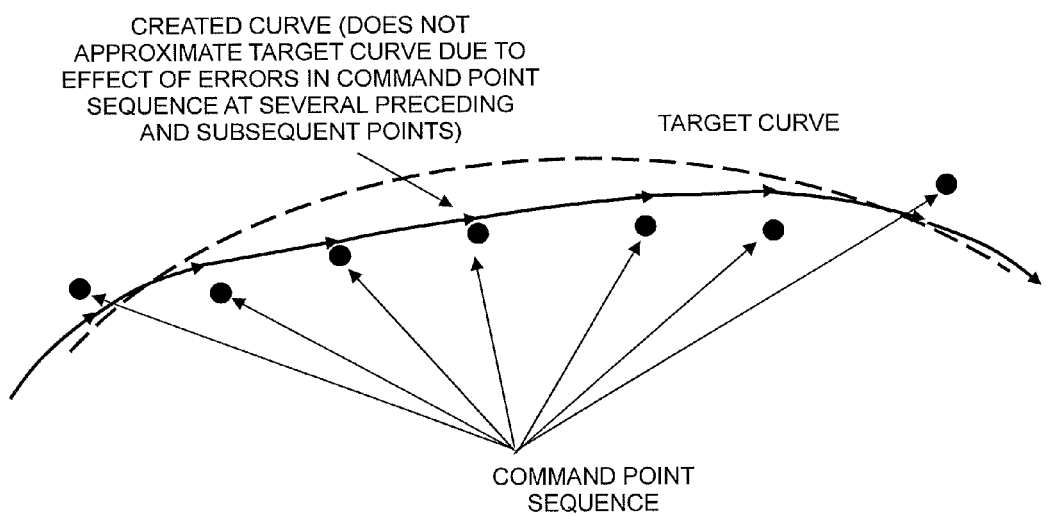
FIG. 3 is a diagram illustrating that an error in command point sequence positions with respect to a target curve prevents correction that approximates the target curve according to conventional art.
Figure 4:
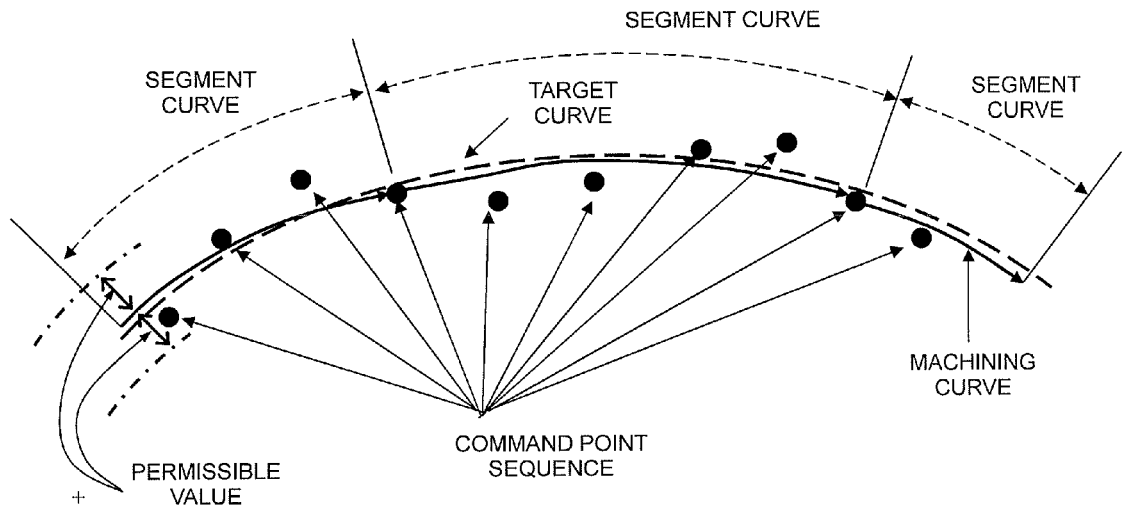
FIG. 4 is a diagram illustrating a method of creating a machining curve according to the present invention.

In the present invention, a single cubic curve (segment curve) is created which corresponds to a point sequence including the maximum number of command points. A plurality of such cubic curves is connected to create a curve for machining (a machining curve), the machining curve is interpolated, and machining is performed by driving drive axes of a machine tool to the interpolated positions on the machining curve. The plurality of cubic curves are connected so that second-derivative vectors of cubic functions that represent the respective cubic curves are continuous among the cubic curves. In this case, continuous means practically continuous and not theoretically continuous. The machining curve is created as a group of cubic curves (spline curve) created in this manner. Creation of such a machining curve is sequentially performed without reading in all points constituting a command point sequence (FIG. 4).

Accordingly, the following aims can be achieved.

(1) Preventing occurrence of deceleration due to an insufficient capacity of a numerical controller for creating and interpolating a machining curve even if intervals between the command points are small by creating a cubic curve (segment curve) corresponding to the maximum number of command points.

(2) Creating a machining curve that more closely approximates a target curve even if a command point sequence has a variation due to error with respect to the target curve.

(3) Providing the machining curve with continuous first-derivative vectors and practically-continuous second-derivative vectors at each point constituting the command point sequence. In addition, confining an error of the machining curve from the command point sequence within a permissible value. Accordingly, a smooth machining shape of which error from the command point sequence is within a permissible value and a smooth machining operation with continuous acceleration of each drive axis are obtained.

(4) Enabling a machining curve to be created without necessitating a large memory or a long computation time by creating the machining curve without reading in all points that constitute the command point sequence.

FIG. 4 shows a sequence of command points (depicted by black dots: ●) which have an error with respect to a target curve (depicted by a dashed line) being commanded, and a segment curve (arrowed solid line) that is a cubic curve in a given segment of the command point sequence being created using the techniques according to the present invention. A function representing a cubic curve (segment curve) is a cubic function and a curve for machining (machining curve) is a curve that connects segment curves to each other. In addition, FIG. 4 shows that an error between the command point sequence and the machining curve is within a permissible value.

Hereinafter, a first embodiment of a numerical controller with a machining curve creating function according to the present invention will be described.

<Outline>

Processes performed by a segment curve creating unit that is a critical part of the present invention will now be outlined. More specifically, in a case where a given point $P_{s(k)}$ of a command point sequence $P_0, P_1, P_2, \ldots, P_n$ having $P_0$ as a starting point and $P_n$ as an ending point and a first-derivative vector $P_{s(k)}'$ at the point $P_{s(k)}$ have already been determined, a method of creating a cubic function for a segment curve that is a cubic curve having $P_{s(k)}$ as a starting point will be outlined. Subscripts in the command point sequence $P_0, P_1, P_2, \ldots, P_n$ represent numbers of command points.

k denotes the number of a segment curve to be created. k is incremented per segment curve by one so that k=0 for a first segment curve starting at $P_0$, k=1 for a next segment curve, and so on. s(k) denotes the number of a command point of a segment starting point that is a starting point of a (k+1)th segment curve. e(k) denotes the number of a command point of a segment ending point that is an ending point of the (k+1)th segment curve. In other words, the (k+1)th segment curve is a cubic curve having a command point $P_{s(k)}$ as a segment starting point and a command point $P_{e(k)}$ as a segment ending point.

[1] Let ns (number of skips) denote the number of command points to be skipped after $P_{s(k)}+1$. Assume that an initial value nsi (initial number of skips) has been given. In this case, skipping a command point means that the command point is not used during segment curve creation.

[2] Let nc denote a predetermined number of points that specifies the number of points used for cubic curve creation among a point sequence subsequent to $P_{s(k)+ns}$. Based on a point sequence consisting of $P_{s(k)}, P_{s(k)+ns}, \ldots, P_{s(k)+ns+nc}$ and on $P_{s(k)}'$, determine a first-derivative vector $P_{s(k)+ns}'$ at $P_{s(k)+ns}$ such that second-derivative vectors of preceding and subsequent cubic functions at $P_{s(k)+ns}$ are practically continuous. However, in this case, nc=3 is set for the sake of simplicity. Generally, the greater the value of nc, the better the continuity of second-derivative vectors of preceding and subsequent cubic functions at the segment ending point and the segment starting point.

$P_{s(k)}$ denotes a position of the segment starting point, $P_{s(k)+ns}$ denotes a position of the segment ending point, $P_{s(k)}'$ denotes a segment starting point vector (a first-derivative vector of a segment curve at the segment starting point), and $P_{s(k)+ns}'$ denotes a segment ending point vector (a first-derivative vector of a segment curve at the segment ending point). Hereinafter, $P_x$ (x=0, 1, ..., n; x=s(k), s(k)+ns, and so on) denotes points as well as positions thereof.

Figure 5:
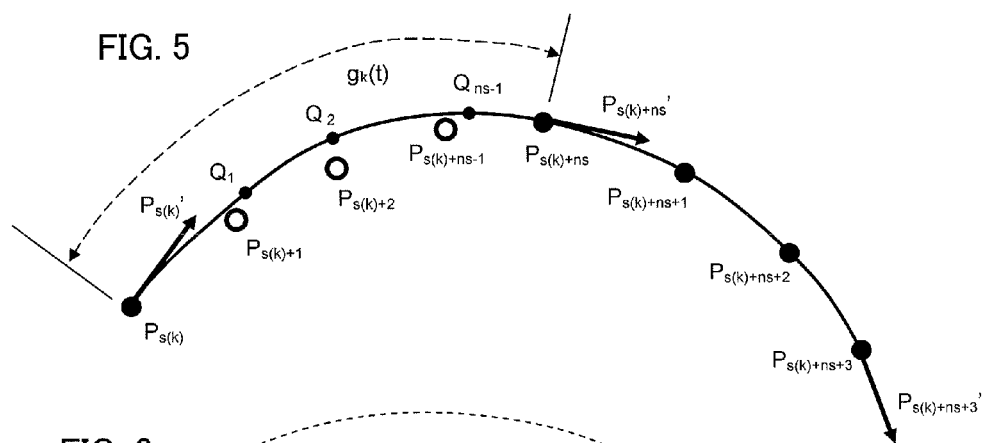
FIG. 5 is a diagram illustrating a method of creating a cubic function for a segment curve that is a cubic curve.

[3] Represent a point sequence $P_{s(k)}, P_{s(k)+ns}, \ldots, P_{s(k)+ns+3}$ and $P_{s(k)}'$ as shown in FIG. 5. In FIG. 5 (and similarly in FIGS. 6 and 7 to be described later), $P_{s(k)}, P_{s(k)+ns}, \ldots, P_{s(k)+ns+3}$ are represented by large black dots (●) and $P_{s(k)+1}, \ldots, P_{s(k)+ns-1}$ which are skipped (not used when determining $P_{s(k)+ns}'$) are represented by outlined dots (○).

Determine a first-derivative vector $P_{s(k)+ns+3}'$ at $P_{s(k)+ns+3}$. For example, create an arc or a quadratic curve (parabola) that passes through the three points $P_{s(k)+ns+1}, P_{s(k)+ns+2}$, and $P_{s(k)+ns+3}$ and adopt a tangential direction at the point $P_{s(k)+ns+3}$ on the arc or the quadratic curve as $P_{s(k)+ns+3}'$, or adopt a tangential direction of a straight line passing through the two points $P_{s(k)+ns+2}$ and $P_{s(k)+ns+3}$ as $P_{s(k)+ns+3}'$.

Moreover, while the first-derivative vector $P_{s(k)+ns+3}'$ at $P_{s(k)+ns+3}$ is used in this case, as described earlier in "<1>

Curve creation, 1-1", other conditions (second-derivative vector $P_{s(k)+ns+3}''=0$) can be adopted (to be described in the second embodiment).

[4] Create Expression (7) below by applying Expression (1) above to $P_{s(k)}$, $P_{s(k)+ns}$, $P_{s(k)+ns+1}$, $P_{s(k)+ns+2}$, $P_{s(k)+ns+3}$, $P_{s(k)}'$, $P_{s(k)+ns}'$, $P_{s(k)+ns+}'$, $P_{s(k)+ns+2}'$, and $P_{s(k)+ns+3}'$. Meanwhile, $P_{s(k)+ns}'$ can be determined with Expression (8-1) below which corresponds to Expression (3) above.

$$\begin{bmatrix} 1 & 0 & 0 & 0 & 0 \\ t_2 & 2(t_1+t_2) & t_1 & 0 & 0 \\ 0 & t_3 & 2(t_2+t_3) & t_2 & 0 \\ 0 & 0 & t_4 & 2(t_3+t_4) & t_3 \\ 0 & 0 & 0 & 0 & 1 \end{bmatrix} \begin{bmatrix} P'_{s(k)} \\ P'_{s(k)+ns} \\ P'_{s(k)+ns+1} \\ P'_{s(k)+ns+2} \\ P'_{s(k)+ns+3} \end{bmatrix} = \quad (7)$$

$$\begin{bmatrix} P'_{s(k)} \\ \frac{3}{t_1 t_2}(t_1^2(P_{s(k)+ns+1}-P_{s(k)+ns})+t_2^2(P_{s(k)+ns}-P_{s(k)})) \\ \frac{3}{t_2 t_3}(t_2^2(P_{s(k)+ns+2}-P_{s(k)+ns+1})+t_3^2(P_{s(k)+ns+1}-P_{s(k)+ns})) \\ \frac{3}{t_3 t_4}(t_3^2(P_{s(k)+ns+3}-P_{s(k)+ns+2})+t_4^2(P_{s(k)+ns+2}-P_{s(k)+ns+1})) \\ P'_{s(k)+ns+3} \end{bmatrix}$$

$$\begin{bmatrix} P'_{s(k)} \\ P'_{s(k)+ns} \\ P'_{s(k)+ns+1} \\ P'_{s(k)+ns+2} \\ P'_{s(k)+ns+3} \end{bmatrix} = \begin{bmatrix} 1 & 0 & 0 & 0 & 0 \\ t_2 & 2(t_1+t_2) & t_1 & 0 & 0 \\ 0 & t_3 & 2(t_2+t_3) & t_2 & 0 \\ 0 & 0 & t_4 & 2(t_3+t_4) & t_3 \\ 0 & 0 & 0 & 0 & 1 \end{bmatrix}^{-1} * \quad (8\text{-}1)$$

$$\begin{bmatrix} P'_{s(k)} \\ \frac{3}{t_1 t_2}(t_1^2(P_{s(k)+ns+1}-P_{s(k)+ns})+t_2^2(P_{s(k)+ns}+P_{s(k)})) \\ \frac{3}{t_2 t_3}(t_2^2(P_{s(k)+ns+2}-P_{s(k)+ns+1})+t_3^2(P_{s(k)+ns+1}-P_{s(k)+ns})) \\ \frac{3}{t_3 t_4}(t_3^2(P_{s(k)+ns+3}-P_{s(k)+ns+2})+t_4^2(P_{s(k)+ns+2}-P_{s(k)+ns+1})) \\ P'_{s(k)+ns+3} \end{bmatrix}$$

where $t_1$ to $t_4$ are as defined in Expression (8-2) below.

$$t_1 = \sum_{i=1}^{ns} |P_{s(k)+i} - P_{s(k)+i-1}|, \quad (8\text{-}2)$$

$$t_2 = |P_{s(k)+ns+1} - P_{s(k)+ns}|,$$

$$t_3 = |P_{s(k)+ns+2} - P_{s(k)+ns+1}|,$$

$$t_4 = |P_{s(k)+ns+3} - P_{s(k)+ns+2}|$$

Moreover, the entire inverse matrix on the right-hand side of Expression (8-1) above need not be determined. By determining the second row of the inverse matrix on the right-hand side of Expression (8-1), $P_{s(k)+ns}'$ can be determined.

[5] In a similar manner to Expressions (4), (5), and (6) above, based on $P_{s(k)}$, $P_{s(k)+ns}$, $P_{s(k)}'$, and $P_{s(k)+ns}'$, determine a function $g_k(t)$ ($0 \le t \le t_k$) representing a cubic curve between $P_{s(k)}$ and $P_{s(k)+ns}$ as represented by Expression (9) below. $Ag_k$, $Bg_k$, $Cg_k$, and $Dg_k$ represent vectors of drive axes and are coefficients of a function that represents the cubic curve. $t_k$ denotes a distance between $P_{s(k)}$ and $P_{s(k)+ns}$ and corresponds to $t_1$ in Expression (8-2) above.

$$g_k(t) = Ag_k*t^3 + Bg_k*t^2 + Cg_k*t + Dg_k \quad (9)$$

The four coefficients $Ag_k$, $Bg_k$, $Cg_k$, and $Dg_k$ can be derived from four conditions $P_{s(k)}$, $P_{s(k)+ns}$, $P_{s(k)}'$, and $P_{s(k)+ns}'$ in a similar manner to that described with reference to Expressions (5) and (6) above. In other words, when $g_k$ (t) is expressed as represented by Expression (9) above, $g_k'$ (t) may be expressed as represented by Expression (10) below. Therefore, Expression (11) holds, and by determining $Ag_k$, $Bg_k$, $Cg_k$, and $Dg_k$ by solving Expression (11), the function $g_k(t)$ can be determined.

$$g_k'(t) = 3*Ag_k*t^2 + 2*Bg_k*t + Cg_k \quad (10)$$

$$g_k(0) = Dg_k = P_{s(k)}$$

$$g_k(t_k) = Ag_k*t_k^3 + Bg_k*t_k^2 + Cg_k*t_k + Dg_k = P_{s(k)+ns}$$

i $g_k'(0) = Cg_k = P_{s(k)}'$ $$g_k'(t_k) = 3*Ag_k*t_k^2 + 2*Bg_k*t_k + Cg_k = P_{s(k)+ns}' \quad (11)$$

[6] Determine $Q_1, Q_2, \ldots, Q_{ns-1}$ as points corresponding to $P_{s(k)+1}, P_{s(k)+2}, \ldots, P_{s(k)+ns-1}$ on $g_k$ (t) as represented by Expression (12) below. In other words, determine the points $Q_1, Q_2, \ldots, Q_{ns-1}$ by adding distances between the points $P_{s(k)+1}, P_{s(k)+2}, \ldots, P_{s(k)+ns-1}$ as t corresponding to $P_{s(k)+1}, P_{s(k)+2}, \ldots, P_{s(k)+ns-1}$ and substituting the result into t of $g_k(t)$.

$$Q_1 = g_k(|P_{s(k)+1} - P_{s(k)}|) \quad (12)$$

$$Q_2 = g_k(|P_{s(k)+1} - P_{s(k)}| + |P_{s(k)+2} - P_{s(k)+1}|)$$

$$\ldots$$

$$Q_{ns-1} = g_k\left(\begin{array}{c}|P_{s(k)+1} - P_{s(k)}| + |P_{s(k)+2} - P_{s(k)+1}| + \ldots + \\ |P_{s(k)+ns-1} - P_{s(k)+ns-2}|\end{array}\right)$$

[7] Determine distances between the points $Q_1, Q_2, \ldots, Q_{ns-1}$ and corresponding points $P_{s(k)+1}, P_{s(k)+2}, \ldots, P_{s(k)+ns-1}$, and compare all of the distances with a permissible value Tol set in advance as represented by Expression (13) below to see whether the distances are equal to or smaller than the permissible value Tol. In this case, points $Q_1, Q_2, \ldots, Q_{ns-1}$ corresponding to $P_{s(k)+1}, P_{s(k)+2}, \ldots, P_{s(k)+ns-1}$ are determined using Expression (12) above, the distances between the determined points $Q_1, Q_2, \ldots, Q_{ns-1}$ and $P_{s(k)+1}, P_{s(k)+2}, \ldots, P_{s(k)+ns-1}$ are determined, and the distances are compared to see whether the distances are equal to or smaller than the permissible value Tol. However, furthermore, points corresponding to intermediate points (for example, midpoints) between $P_{s(k)}, P_{s(k)+1}, P_{s(k)+2}, \ldots, P_{s(k)+ns-1}, P_{s(k)+ns}$ may be determined in a similar manner to Expression (12) above, distances between these points and the intermediate points (midpoints) between $P_{s(k)}, P_{s(k)+1}, P_{s(k)+2}, \ldots, P_{s(k)+ns-1}, P_{s(k)+ns}$ may be determined, and a comparison may be made to see whether the distances are equal to or smaller than the permissible value Tol.

$$|Q_1 - P_{s(k)+1}| \le Tol \quad (13)$$

$$|Q_2 - P_{s(k)+2}| \le Tol$$

$$\ldots$$

$$|Q_{ns-1} - P_{s(k)+ns-1}| \le Tol$$

Figure 6:
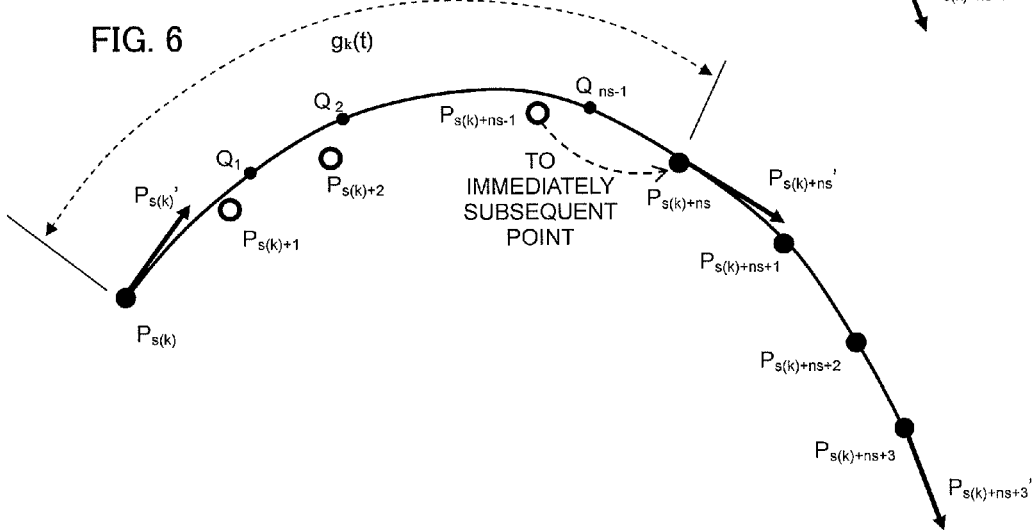
FIG. 6 is a diagram illustrating a method of creating a cubic function for a segment curve that is a cubic curve.

[8] If all of Expression (13) holds (within the permissible value), set ns=ns+1 or, in other words, set $P_{s(k)+ns}$ to an immediately subsequent point and repeat [3] to [7] (refer to FIG. 6). If any one of Expression (13) does not hold, a last $g_k(t)$ in a case where all of Expression (13) hold is the sought cubic function $f_k(t)$ for a segment curve between $P_{s(k)}, \ldots, P_{e(k)}$. In other words, let $f_k(t)=g_k(t)$. At this point (normally), $e(k)=s(k)+ns-1$ holds. Letting $f_k(t)=g_k(t)$ means that a function form of $f_k(t)$ is determined as represented by Expression (14) below. $Af_k$, $Bf_k$, $Cf_k$, and $Df_k$ represent vectors of drive axes and are coefficients of a function. A range of t ($0 \le t \le t_k$) of $f_k(t)$ is also determined at this point (the same applies to the description below).

As an additional note, this $f_k(t)$ is not the same as $f_i(t)$ described in "<1> Curve creation, 1-1".

$$Af_k=Ag_k, Bf_k=Bg_k, Cf_k=Cg_k, Df_k=Dg_k f_k(t)=Af_k*t^3+Bf_k*t^2+Cf_k*t+Df_k \qquad (14)$$

Figures 7, 8:
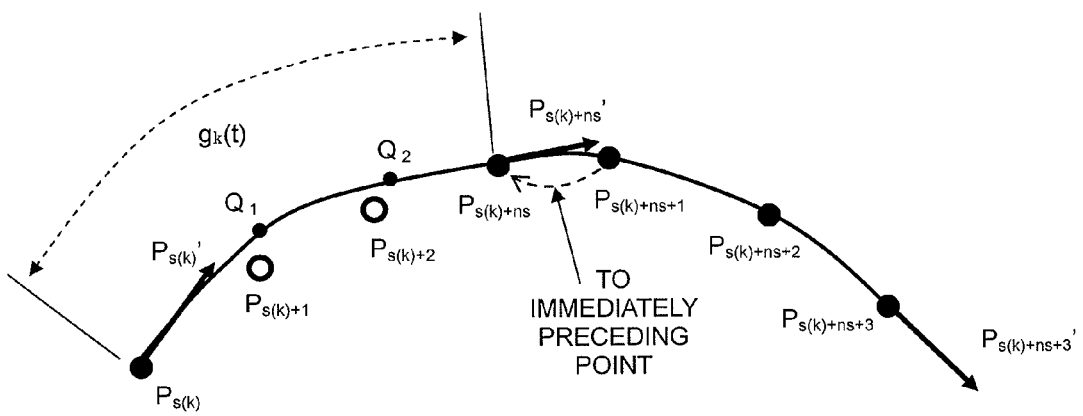
FIG. 7 is a diagram illustrating a method of creating a cubic function for a segment curve that is a cubic curve.
FIG. 8 is a diagram illustrating a command example of a machining program.

[9] If any one of Expression (13) does not hold (outside the permissible value), set ns=ns−1 or, in other words, set $P_{s(k)+ns}$ to an immediately preceding point and repeat [3] to [7] (refer to FIG. 7). Once all of Expression (13) holds, the $g_k(t)$ at that point is the sought cubic function $f_k(t)$ for a segment curve between $P_{s(k)}, \ldots, P_{e(k)}$. In other words, let $f_k(t)=g_k(t)$. At this point, $e(k)=s(k)+ns$ holds. However, if ns=1 when ns=ns−1, since a preceding ns does not exist, the $g_k(t)$ derived based on $P_{s(k)}$, $P_{s(k)+1}$, $P_{s(k)}'$, and $P_{s(k)+1}'$ using Expressions (9), (10), and (11) is the sought cubic function $f_k(t)$ for a segment curve between $P_{s(k)}$ $_{and}$ $_{Ps(k)+1}$ (in other words, between $P_{s(k)}$ and $P_{e(k)}$). At this point, $e(k)=s(k)+1$ holds.

In this case, as described in [8] or [9], by determining the cubic function $f_k(t)$ by identifying a maximum ns that allows all of Expression (13) to hold, while setting the initial number of skips nsi to the first ns and varying ns to ns=ns+1 or ns=sn−1 (or increasing or decreasing ns), a segment curve is created so that the distance of the segment curve from a segment command point sequence is within a permissible value set in advance and the maximum number of command points are included between a segment starting point that is a starting point of the segment command point sequence and a segment ending point that is an ending point of the segment command point sequence.

Moreover, while an appropriate ns is determined in this case by setting nsi to the first ns and varying ns to ns=ns+1 or ns=ns−1, a segment curve can also be determined by identifying an appropriate ns while significantly varying ns using a bisection method instead of ns=ns+1 or ns=ns−1. For example, ns=2*ns may be used instead of ns=ns+1 and ns=INT (ns/2) may be used instead of ns=ns−1, where INT denotes integer number. Alternatively, an appropriate ns may be determined by sequentially varying ns from 1 while setting nsi=1 and ns=ns+1. There are various other methods of determining an appropriate ns. Since such methods are conventional art, a detailed description will not be given herein.

Moreover, while a segment curve is assumed to be a cubic curve expressed by a cubic polynomial as represented by Expressions (9) and (14) above, the techniques according to the present invention can also be applied to a lower-order quadratic curve or to curves of the fourth or higher orders. In addition, the present invention is also applicable to other curves such as a NURBS curve or a Bezier curve.

<Machining Program>

FIG. 8 shows a command example of a machining program. "G05.1 Q1" is a machining start command, and positions on X, Y, and Z axes at the time of the machining start command are represented by a starting point $P_0$. If other axes (U, V, W, A, B, C, and the like) are also drive axes, $P_0$ is a position that also includes positions on such axes. If X and Y axes are the only drive axes, $P_0$ represents positions on the X and Y axes at that moment. In this case, the X, Y, and Z axes are assumed to be drive axes. Therefore, subsequent point sequences and curves are to be represented on an (X, Y, Z) coordinate system. Positions of a point sequence $P_1, P_2, \ldots$ are commanded in N002 and subsequent blocks of the machining program. "G05.1 Q0" is a machining end command, and positions on X, Y, and Z axes at the time of the machining end command are represented by an ending point $P_n$. F denotes command speed. In this case, it is assumed that a point sequence $P_0, P_1, P_2, \ldots, P_n$ itself of command points commanded by the machining program is a command point sequence used in machining.

Details of processes performed on the command point sequence $P_0, P_1, P_2, \ldots, P_n$ will be described with reference to the flowcharts shown in FIGS. 9 to 12. nc=3 is set in a similar manner to <Outline> [2] described above. It is also assumed that a sufficiently large number of points (five points or more) have been commanded as the command point sequence.

<Machining Curve Creation>

Figure 9:
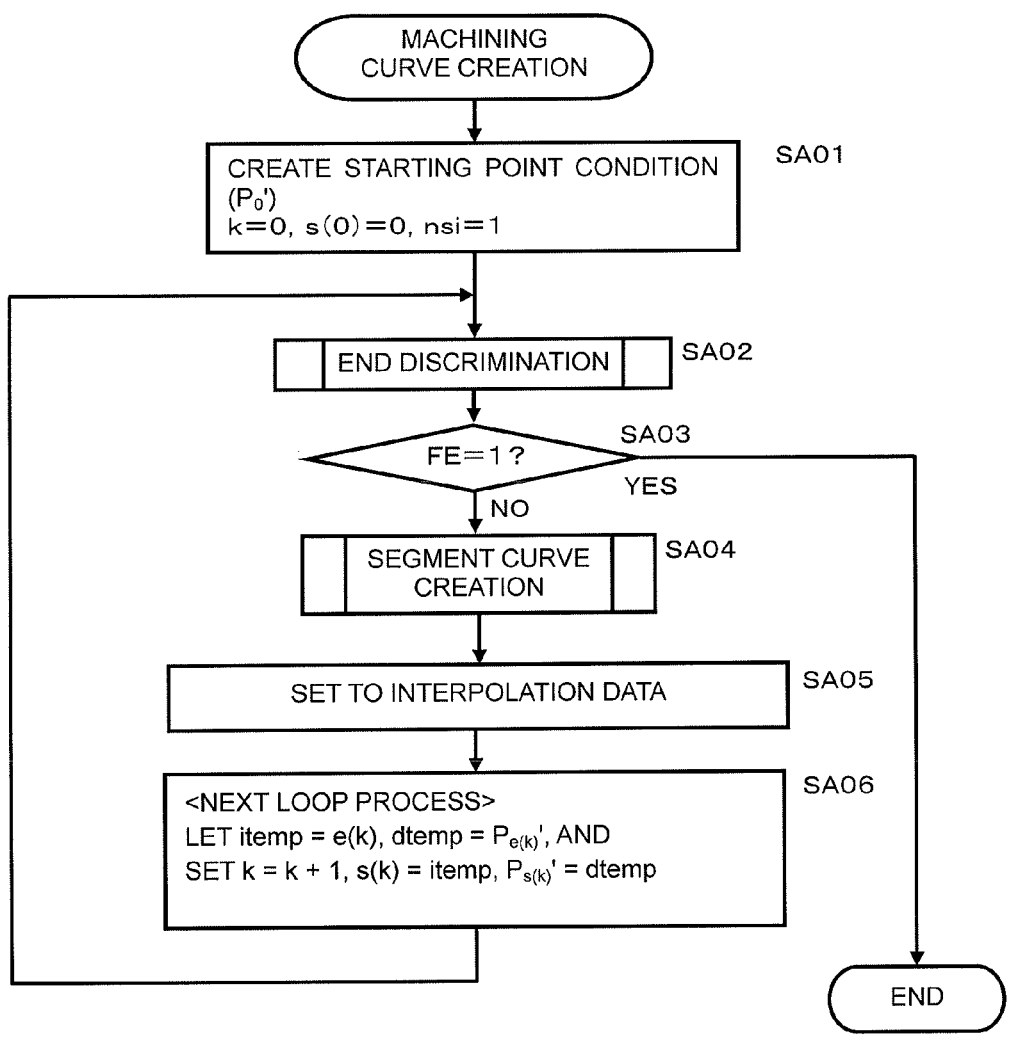
FIG. 9 is a flow chart illustrating a process performed by a machining curve creating unit.

A process performed by the machining curve creating unit will be described in detail with reference to the flow chart shown in FIG. 9.

[Step SA01] Create a starting point condition and perform initial value setting in order to create a first segment curve. In this case, a first-derivative vector $P_0'$ of a cubic function representing the first segment curve is adopted as the starting point condition. To create $P_0'$, for example, a tangential direction at the point $P_0$ when $P_0$, $P_1$, and $P_2$ are connected by an arc can be adopted as $P_0'$, a tangential direction at the point $P_0$ when $P_0$, $P_1$, and $P_2$ are connected by a quadratic curve (parabola) can be adopted as $P_0'$, or a tangential direction at the point $P_0$ when $P_0$ and $P_1$ are connected by a straight line can be adopted as $P_0'$. In this case, $P_0$ represents a starting point, $P_1$ a second point, and $P_2$ a third point. Let k=0, s(0)=0, and nsi=1. k=0 means that a first segment curve is to be created, s(0)=0 means that a segment starting point that is a starting point of the first segment curve is set as $P_0$, and nsi=1 means that the initial number of skips is set to 1.

Moreover, as already described in "<1> Curve creation, 1-1", $P_0'=0$ can also be adopted as the starting point condition (to be described in the second embodiment).

[Step SA02] Call and activate end discrimination (to be described later), and obtain an FE (ending flag).

[Step SA03] Check the FE to see whether a value thereof is 1 or not. Since FE=0 is set when creating a first segment curve, the process proceeds to segment curve creation of step SA04. However, when the process is to be ended after segment curve creation subsequent to the first segment curve, FE=1 is set and the process by the machining curve creating unit is terminated.

[Step SA04] Create a segment curve (initially, the first segment curve) according to segment curve creation (to be described later).

[Step SA05] Set the created segment curve to interpolation data. In other words, set data ($Af_k$, $Bf_k$, $Cf_k$, $Df_k$, $P_{s(k)}$, $P_{e(k)}$, and $t_k$) for interpolating a created function $f_k(t)$ to interpolation data (to be described later).

[Step SA06] Let item p=e(k), dtemp=$P_{e(k)}'$, and set k=k+1, s(k)=itemp, and $P_{s(k)}'$=dtemp. Accordingly, increment k by one, set the number e(k) of a command point of the segment ending point that is the ending point of the created segment curve (initially, the first segment curve) as the number s(k)

of a command point of a segment starting point of a next segment curve or, in other words, set $P_{s(k)}$ as a new segment starting point, and adopt a first-derivative vector at the segment ending point as a first-derivative vector at the segment starting point of the next segment curve or, in other words, a new segment starting point vector. The process then returns to the end discrimination of step SA02.

<Segment Curve Creation>

Figure 10:
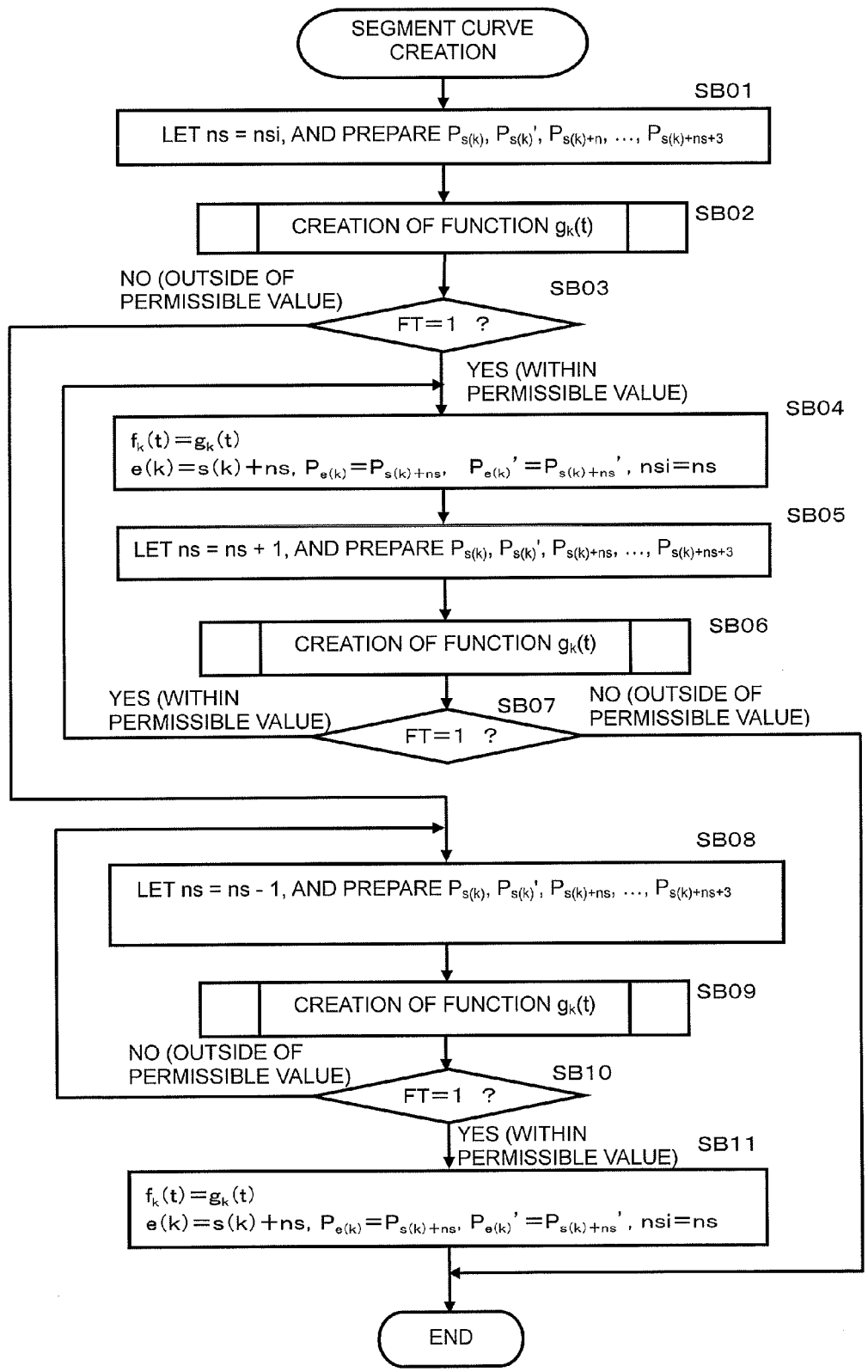
FIG. 10 is a flow chart illustrating a process performed by a segment curve creating unit.

A process performed by the segment curve creating unit will be described in detail with reference to the flow chart shown in FIG. 10 (as well as FIGS. 5 to 7).

[Step SB01] Let ns=nsi. In other words, set the number of skips ns to the initial number of skips nsi. When creating a first segment curve, nsi=1 is given. For segment curve creation after the first segment curve has been created, nsi has been determined during a previous segment curve creation. Prepare $P_{s(k)}$, $P_{s(k)}'$, $P_{s(k)+ns}$, ..., $P_{s(k)+ns+3}$. Regarding the number s(k) of a command point that is a segment starting point, s(k)=0 is set for the creation of the first segment curve, and for segment curve creation after the first segment curve has been created, a current s(k) is determined during a previous segment curve creation. Therefore, a command point sequence $P_{s(k)}$, $P_{s(k)+ns}$, ..., $P_{s(k)+ns+3}$ can be prepared. However, command points are not prepared beyond an ending point $P_n$. Regarding $P_{s(k)}'$, $P_{s(k)}'$ has already been determined upon the creation of the first segment curve (refer to [Step SA01] of <Machining curve creation>), and for segment curve creation after the first segment curve has been created, a segment ending point vector upon a previous segment curve creation is adopted as a current segment starting point vector $P_{s(k)}'$ (refer to [5] of <Machining curve creation>).

[Step SB02] Call and activate creation (to be described later) of a function $g_k(t)$. In addition, create a flag (FT) which indicates whether or not the created function $g_k(t)$ is within a permissible value set in advance for $P_{s(k)+1}$, ..., $P_{s(k)+ns-1}$.

[Step SB03] Check the flag FT to determine whether or not the created function $g_k(t)$ is within the permissible value. If the flag FT is within the permissible value (YES), the process proceeds to step SB04, and if not (NO), the process proceeds to SB08.

[Step SB04] By letting $f_k(t)=g_k(t)$, tentatively accept the created function $g_k(t)$ as a function $f_k(t)$ of a current segment curve. As described earlier, letting $f_k(t)=g_k(t)$ means that a function form of $f_k(t)$ is determined as represented by Expression (14) below. From e(k)=s(k)+ns, tentatively set the number e(k) of a command point of a segment ending point and $P_{e(k)}=P_{s(k)+ns}$, $P_{e(k)}'=P_{s(k)+ns}'$. Let nsi=ns, and tentatively set the initial number of skips for a next segment curve creation. $P_{e(k)}$ represents a tentative segment ending point and $P_{e(k)}'$ represents a tentative segment ending point vector.

[Step SB05] Let ns=ns+1, and prepare $P_{s(k)}$, $P_{s(k)}'$, $P_{s(k)+ns}$, ..., $P_{(k)+ns+3}$. However, command points are not prepared beyond an ending point $P_n$.

[Step SB06] Call and activate creation (to be described later) of a function $g_k(t)$.

[Step SB07] Check the flag FT to determine whether or not the created function $g_k(t)$ is within the permissible value. If the created function $g_k(t)$ is within the permissible value (YES), the process proceeds to step SB04, and if not (NO), the process by the segment curve creating unit is terminated with the result last obtained by the processing in step SB04. In other words, the function $f_k(t)$ last obtained in step SB04 is a function of the current segment curve, e(k) is the number of a command point of the segment ending point, $P_{e(k)}$ is a new segment ending point, $P_{e(k)}'$ is a new segment ending point vector, and nsi is the initial number of skips for a next segment curve creation.

[Step SB08] Let ns=ns−1, and prepare $P_{s(k)}$, $P_{s(k)}'$, $P_{s(k)+ns}$, ..., $P_{(k)+ns+3}$. However, command points are not prepared beyond an ending point $P_n$.

[Step SB09] Call and activate creation (to be described later) of a function $g_k(t)$.

[Step SB10] Check the flag FT to determine whether or not the created function $g_k(t)$ is within the permissible value. If the flag FT is within the permissible value (YES), the process proceeds to step SB11 since the function $g_k(t)$ has been obtained, and if not (NO), the process returns to SB08.

[Step SB11] By letting $f_k(t)=g_k(t)$, adopt the created function $g_k(t)$ as a function $f_k(t)$ of a current segment curve. From e(k)=s(k)+ns, the number e(k) of a command point of a segment ending point is set and $P_{e(k)}=P_{s(k)+ns}$, $P_{e(k)}'=P_{s(k)+ns}'$. Let nsi=ns, set the initial number of skips for a next segment curve creation, and terminate the process of the segment curve creating unit. $P_{e(k)}$ represents a new segment ending point and $P_{e(k)}'$ represents a new segment ending point vector.

<Creating Function $g_k(t)$>

Figure 11:
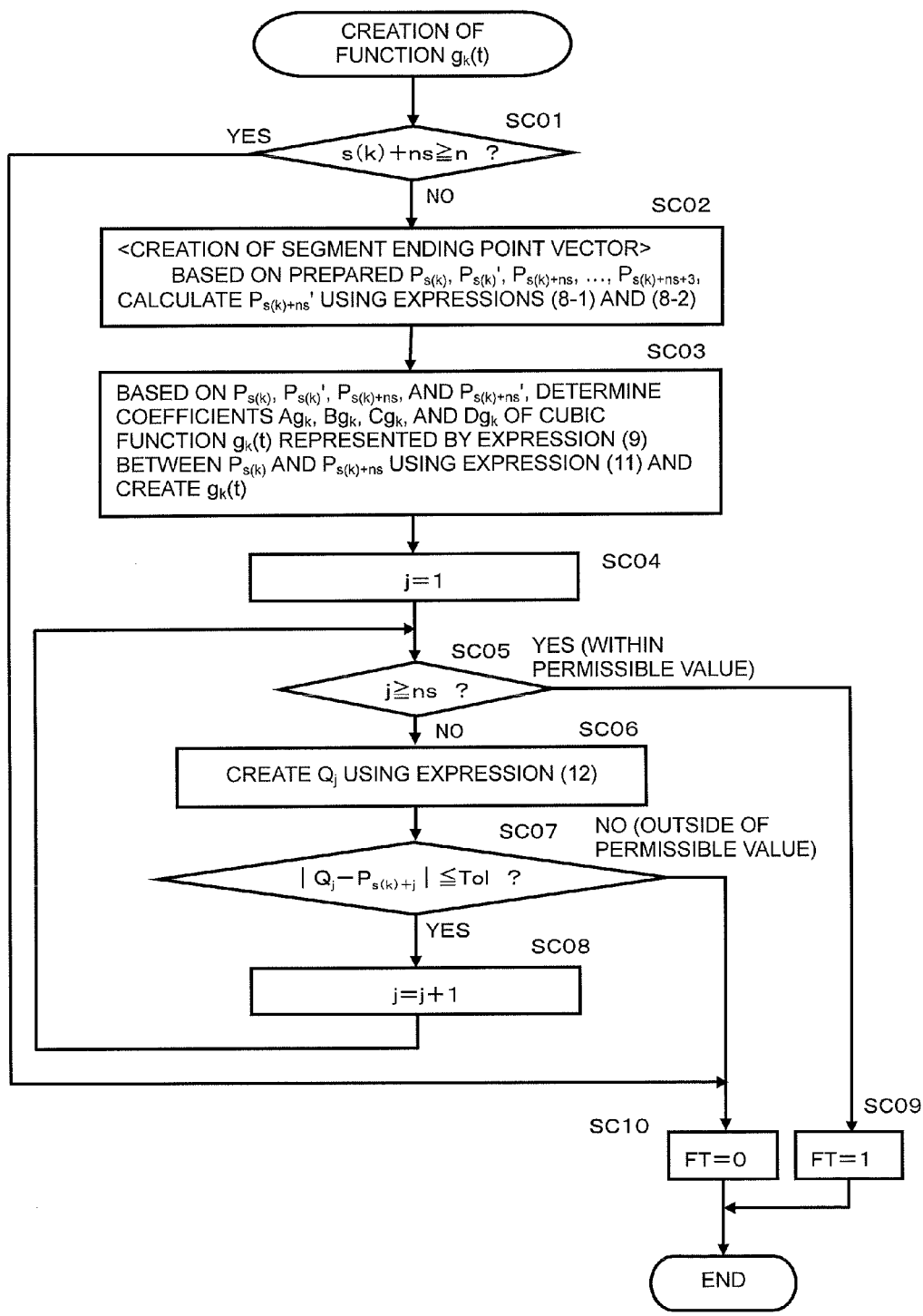
FIG. 11 is a flow chart illustrating a process for creating a function $g_k(t)$.

A process for creating a function $g_k(t)$ which is called and activated by the process performed by the segment curve creating unit will now be described in detail with reference to a flow chart shown in FIG. 11.

[Step SC01] If s(k)+ns≥n holds (YES) or, in other words, if skipping command points according to the number of skips results in exceeding an ending point, since the function $g_k(t)$ cannot be created by a method described in step SC02 and thereafter, the process proceeds to step SC10. A last function $g_k(t)$ is created during end discrimination (to be described later).

[Step SC02] From the prepared $P_{s(k)}$, $P_{s(k)}'$, $P_{s(k)+ns}$, ..., $P_{s(k)+ns+3}$, calculate $P_{s(k)+ns}'$ using Expressions (8-1) and (8-2) as described in <Outline [3], [4] >. However, although not described in the flow chart shown in FIG. 11 as the case is special, when $P_{s(k)+ns}$, ..., $P_{s(k)+ns+3}$ are not prepared beyond the ending point $P_n$ or, in other words, when all of the command points of $P_{s(k)+ns}$, ..., $P_{s(k)+ns+3}$ have not been prepared because (k)+ns+3>n, perform calculations as represented by Expressions (15-1) and (15-2) below or by Expressions (16-1) and (16-2) below instead of Expressions (8-1) and (8-2). In this case, $P_n'$ is obtained by a similar method as described in <Outline> [3].

Moreover, since nc=3, cases where $P_{s(k)+ns}$, ..., $P_{s(k)+ns+3}$ are not prepared beyond the ending point are the two cases respectively represented by Expressions (15-1) and (15-2) below and by Expressions (16-1) and (16-2) below. However, even if nc>3, a calculation of a case where $P_{s(k)+ns}$, ..., $P_{s(k)+ns+nc}$ are not prepared beyond the ending point can be performed in a similar manner.

<When s(k)+ns+1=n (when $P_{s(k)+ns+1}$ is an ending point $P_n$ and a command point sequence beyond the ending point $P_n$ is not prepared)>

(FIG. 13)

$$\begin{bmatrix} P'_{s(k)} \\ P'_{s(k)+ns} \\ P'_{s(k)+ns+1}(=P'_n) \end{bmatrix} = \begin{bmatrix} 1 & 0 & 0 \\ t_2 & 2(t_1+t_2) & t_1 \\ 0 & 0 & 1 \end{bmatrix}^{-1} * \quad (15\text{-}1)$$

-continued $$\begin{bmatrix} P'_{s(k)} \\ \frac{3}{t_1 t_2}(t_1^2(P_{s(k)+ns+1} - P_{s(k)+ns}) + t_2^2(P_{s(k)+ns} - P_{s(k)})) \\ P'_{s(k)+ns+1}(=P'_n) \end{bmatrix}$$

where $t_1$ and $t_2$ are as defined in Expression (15-2) below.

$$t_1 = \sum_{i=1}^{ns} |P_{s(k)+i} - P_{s(k)+i-1}|, \quad (15\text{-}2)$$

$$t_2 = |P_{s(k)+ns+1} - P_{s(k)+ns}|$$

Figure 14:
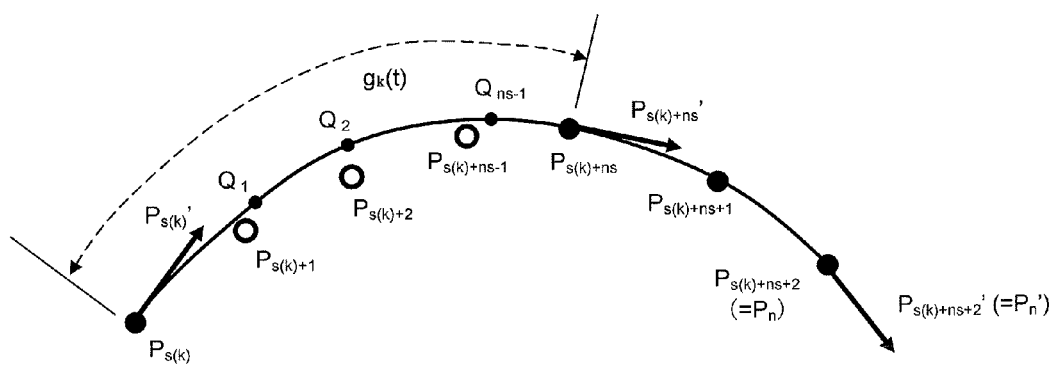
FIG. 14 is a diagram illustrating a case where $P_{s(k)+ns+2}$ is an ending point $P_n$ and a command point sequence is not prepared beyond the ending point $P_n$.

<When s(k)+ns+2=n (when $P_{s(k)+ns+2}$ is an ending point $P_n$ and a command point sequence beyond the ending point $P_n$ is not prepared) >
(FIG. 14)

$$\begin{bmatrix} P'_{s(k)} \\ P'_{s(k)+ns} \\ P'_{s(k)+ns+1} \\ P'_{s(k)+ns+2}(=P'_n) \end{bmatrix} = \begin{bmatrix} 1 & 0 & 0 & 0 \\ t_2 & 2(t_1+t_2) & t_1 & 0 \\ 0 & t_3 & 2(t_2+t_3) & t_2 \\ 0 & 0 & 0 & 1 \end{bmatrix}^{-1} * \quad (16\text{-}1)$$

$$\begin{bmatrix} P'_{s(k)} \\ \frac{3}{t_1 t_2}(t_1^2(P_{s(k)+ns+1} - P_{s(k)+ns}) + t_2^2(P_{s(k)+ns} - P_{s(k)})) \\ \frac{3}{t_2 t_3}(t_2^2(P_{s(k)+ns+2} - P_{s(k)+ns+1}) + t_3^2(P_{s(k)+ns+1} - P_{s(k)+ns})) \\ P'_{s(k)+ns+2}(=P'_n) \end{bmatrix}$$

where $t_1$, $t_2$, and $t_3$ are as defined in Expression (16-2) below.

$$t_1 = \sum_{i=1}^{ns} |P_{s(k)+i} - P_{s(k)+i-1}|, \quad (16\text{-}2)$$

$$t_2 = |P_{s(k)+ns+1} - P_{s(k)+ns}|,$$

$$t_3 = |P_{s(k)+ns+2} - P_{s(k)+ns+1}|$$

[Step SC03] Based on $P_{s(k)}$, $P_{s(k)+ns}$, and $P_{s(k)}'$ as well as $P_{s(k)+ns}'$ determined in step SC02, determine coefficients $Ag_k$, $Bg_k$, $Cg_k$, and $Dg_k$ of the cubic function $g_k(t)$ represented by Expression (9) between $P_{s(k)}$ and $P_{s(k)+ns}$ using Expression (11), and create $g_k(t)$.

[Step SC04] Set an initial value of an index j for checking (refer to Expression (13)) whether or not the function $g_k(t)$ is within a permissible value Tol to 1.

[Step SC05] Compare j with ns. If j≥ns, the process proceeds to step SC09, and if j<ns, the process proceeds to step SC06. Moreover, if ns=1 holds, then j ns invariably holds.

[Step SC06] Create $Q_j$ using Expression (12).

[Step SC07] Compare $|Q_j-P_{s(k)+j}|$ with the permissible value Tol. If $|Q_j-P_{s(k)+j}|$≤Tol (YES), the process proceeds to step SC08, and if $|Q_j-P_{s(k)+j}|$>Tol (NO), the process proceeds to step SC10.

[Step SC08] Let j=j+1, and the process returns to step SC05.

[Step SC09] Set within-permissible value flag FT to 1 to indicate that the function $g_k(t)$ is within the permissible value, and end the process for creating the function $g_k(t)$.

[Step SC10] Set within-permissible value flag FT to 0 to indicate that the function $g_k(t)$ is outside the permissible value, and end the process for creating the function $g_k(t)$.

<End Discrimination>

Figure 12:
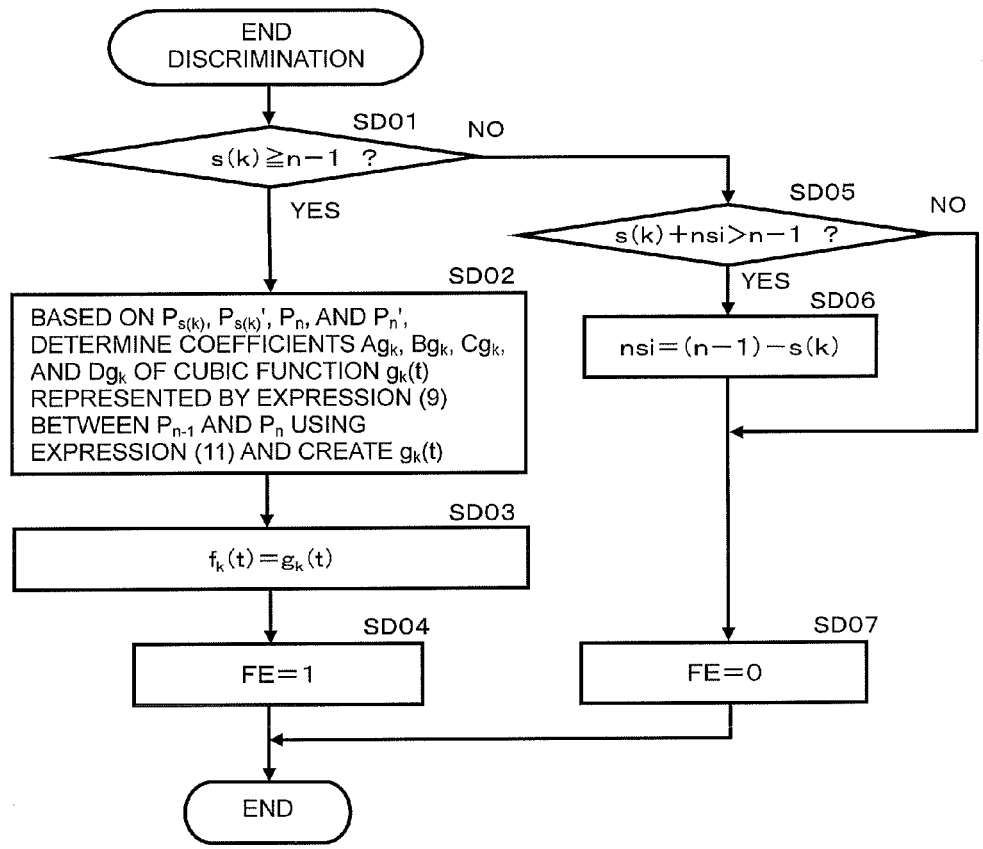
FIG. 12 is a flow chart illustrating a process of end discrimination.
Figure 13:
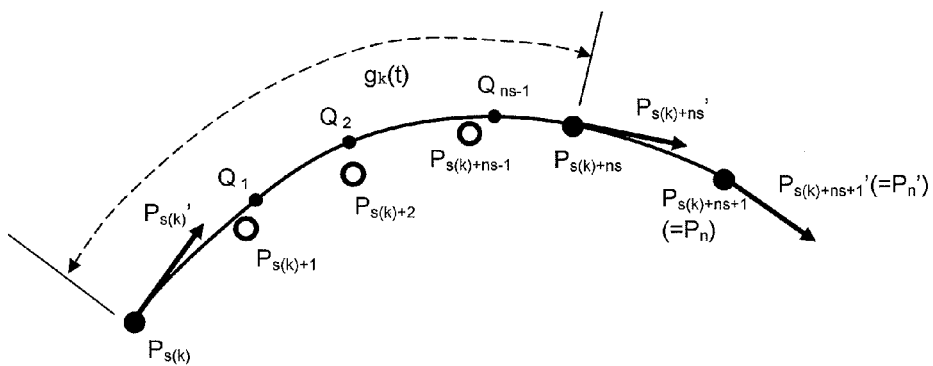
FIG. 13 is a diagram illustrating a case where $P_{s(k)+ns+1}$ is an ending point $P_n$ and a command point sequence is not prepared beyond the ending point $P_n$.

A process for end discrimination which is called and activated by the process performed by the machining curve creating unit will now be described in detail with reference to a flow chart shown in FIG. 12.

[Step SD01] Compare s(k) with n−1. If s(k) n−1 (YES) or, in other words, when s(k) immediately precedes the ending point, the process proceeds to step SD02. On the other hand, if s(k)<n−1 (NO) or, in other words, when s (k) does not immediately precede the ending point, the process proceeds to step SD05.

Figure 15:
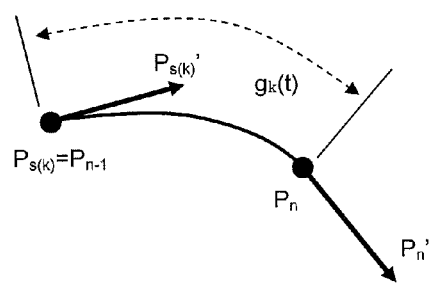
FIG. 15 is a diagram illustrating a process for creating a function $g_k(t)$ immediately prior to an ending point $P_n$.

[Step SD02] Based on $P_{s(k)}$, $P_n$, $P_{s(k)}'$, and $P_n'$, determine coefficients $Ag_k$, $Bg_k$, $Cg_k$, and $Dg_k$ of the cubic function $g_k(t)$ in Expression (9) between $P_{n-1}$ and $P_n$ to create $g_k(t)$. In this case, $P_n'$ is determined by a similar method as described in <Outline> [3] (refer to FIG. 15).

[Step SD03] Let $f_k(t)=g_k(t)$.

[Step SD04] Set FE (ending flag)=1 to indicate a last segment curve. Then, end the process.

[Step SD05] Compare s(k)+nsi with n−1. If s(k)+nsi≤n−1 (NO) or, in other words, when a sum of the number of a command point of the segment starting point and the initial number of skips falls short of a command point number of the ending point (a normal case), the process proceeds to SD07. On the other hand, if s(k)+nsi>n−1 (YES) or, in other words, when a sum of the number of the command point of the segment starting point and the initial number of skips equals a number subsequent to the command point number of the ending point, the process proceeds to SD06.

[Step SD06] Let nsi=(n−1)−s(k) so that the number of the command point of the segment starting point and the initial number of skips add up to n−1.

[Step SD07] Set FE (ending flag)=0. Subsequently, end the process of the end discrimination.

Due to these processes, with the segment curve creating unit which creates a segment curve that is a curve corresponding to a segment command point sequence of each segment of a command point sequence, a segment curve can be created so that the distance of the segment curve from the segment command point sequence is within a permissible value set in advance and the maximum number of command points are included between a segment starting point that is a starting point of the segment command point sequence and a segment ending point that is an ending point of the segment command point sequence, and with the machining curve creating unit, the process of the segment curve creating unit can be repetitively executed from a starting point to an ending point of the command point sequence to create a machining curve.

While a machining curve and a segment curve have been created using X, Y, and Z axes as drive axes of a machine tool, a machining curve and a segment curve can also be created with respect to drive axes including a rotational axis in a multiaxial machine capable of controlling tool directions with the rotational axis. Furthermore, a machining curve and a segment curve can also be created in tool directions commanded by vectors such as (I, J, K) by handling such tool directions in a similar manner to drive axes. In other words, in a similar manner to representing a point sequence or a curve on the (X, Y, Z) coordinate system, processes similar to those of the present embodiment may be performed by representing a tool direction on an (I, J, K) coordinate system, interpolating a machining curve created on the (I, J, K) coordinate system and adopting an interpolated position as a tool direction on the (I, J, K) coordinate system, transforming the interpolated tool direction into a position of a rotational axis that controls the tool direction, and driving the rotational axis.

Next, a second embodiment of a numerical controller with a machining curve creating function according to the present invention will be described.

As the second embodiment, an example will be described in which second-derivative vector $P_0''=0$ at a starting point in a similar manner to that described in "<1> Curve creation, 1-1" is adopted as a starting point condition as described in <Machining curve creation> in the first embodiment. Moreover, in the second embodiment, another condition (second-derivative vector $P_{s(k)+ns+3}''=0$) such as that described in "<1> Curve creation, 1-1" is adopted as a condition at $P_{s(k)+ns+3}$ instead of the first-derivative vector $P_{s(k)+ns+3}$ described in <Outline> [3] of the first embodiment. While a first-derivative vector $P_{s(k)+ns+3}'$ such as that described in the first embodiment may also be used, a second-derivative vector $P_{s(k)+ns+3}''=0$ is adoted as a condition at $P_{s(k)+ns+3}$ in the second embodiment in order to show that various starting point conditions and ending point conditions can be combined as described in "<1> Curve creation, 1-1".

In this case, Expressions (7), (8-1), and (8-2) in the first embodiment in the creation of a first segment curve become Expressions (17), (18-1), and (18-2) below. Expression (17) differs from Expression (7) above in first and last rows of a left-hand matrix and in first and last elements of a right-hand vector. Expression (18-1) differs from Expression (8-1) above in a similar manner. k=0 and s(0)=0. $P_{s(0)}'$ and $P_{s(0)+ns}'$ can be determined from Expressions (18-1) and (18-2), and a function $g_0(t)$ can be derived from $P_{s(0)}'$, $P_{s(0)+ns}'$, $P_{s(0)}$, and $P_{s(0)+ns}$ using Expressions (9), (10), and (11). This is a function that represents a first segment curve.

$$\begin{bmatrix} 2t_1 & t_1 & 0 & 0 & 0 \\ t_2 & 2(t_1+t_2) & t_1 & 0 & 0 \\ 0 & t_3 & 2(t_2+t_3) & t_2 & 0 \\ 0 & 0 & t_4 & 2(t_3+t_4) & t_3 \\ 0 & 0 & 0 & t_4 & 2t_4 \end{bmatrix} \begin{bmatrix} P_{s(0)}' \\ P_{s(0)+ns}' \\ P_{s(0)+ns+1}' \\ P_{s(0)+ns+2}' \\ P_{s(0)+ns+3}' \end{bmatrix} = \tag{17}$$

$$\begin{bmatrix} 3(P_{s(0)+ns} - P_{s(0)}) \\ \frac{3}{t_1 t_2}(t_1^2(P_{s(0)+ns+1} - P_{s(0)+ns}) + t_2^2(P_{s(0)+ns} - P_{s(0)})) \\ \frac{3}{t_2 t_3}(t_2^2(P_{s(0)+ns+2} - P_{s(0)+ns+1}) + t_3^2(P_{s(0)+ns+1} - P_{s(0)+ns})) \\ \frac{3}{t_3 t_4}(t_3^2(P_{s(0)+ns+3} - P_{s(0)+ns+2}) + t_4^2(P_{s(0)+ns+2} - P_{s(0)+ns+1})) \\ 3(P_{s(0)+ns+3} - P_{s(0)+ns+2}) \end{bmatrix}$$

$$\begin{bmatrix} P_{s(0)}' \\ P_{s(0)+ns}' \\ P_{s(0)+ns+1}' \\ P_{s(0)+ns+2}' \\ P_{s(0)+ns+3}' \end{bmatrix} = \begin{bmatrix} 2t_1 & t_1 & 0 & 0 & 0 \\ t_2 & 2(t_1+t_2) & t_1 & 0 & 0 \\ 0 & t_3 & 2(t_2+t_3) & t_2 & 0 \\ 0 & 0 & t_4 & 2(t_3+t_4) & t_3 \\ 0 & 0 & 0 & t_4 & 2t_4 \end{bmatrix} * \tag{18-1}$$

$$\begin{bmatrix} 3(P_{s(0)+ns} - P_{s(0)}) \\ \frac{3}{t_1 t_2}(t_1^2(P_{s(0)+ns+1} - P_{s(0)+ns}) + t_2^2(P_{s(0)+ns} - P_{s(0)})) \\ \frac{3}{t_2 t_3}(t_2^2(P_{s(0)+ns+2} - P_{s(0)+ns+1}) + t_3^2(P_{s(0)+ns+1} - P_{s(0)+ns})) \\ \frac{3}{t_3 t_4}(t_3^2(P_{s(0)+ns+3} - P_{s(0)+ns+2}) + t_4^2(P_{s(0)+ns+2} - P_{s(0)+ns+1})) \\ 3(P_{s(0)+ns+3} - P_{s(0)+ns+2}) \end{bmatrix}$$

where $t_1$ to $t_4$ are as defined in Expression (18-2) below.

$$t_1 = \sum_{i=1}^{ns} |P_{s(0)+i} - P_{s(0)+i-1}|, \tag{18-2}$$

$$t_2 = |P_{s(0)+ns+1} - P_{s(0)+ns}|,$$

$$t_3 = |P_{s(0)+ns+2} - P_{s(0)+ns+1}|,$$

$$t_4 = |P_{s(0)+ns+3} - P_{s(0)+ns+2}|$$

Expressions (7), (8-1), and (8-2) in the first embodiment in segment curve creation after creation of the first segment curve become Expressions (19), (20-1), and (20-2) below. Expression (19) differs from Expression (7) in a last row of the left-hand matrix and a last element of the right-hand vector. Expression (20-1) differs from Expression (8-1) in a similar manner. $P_{s(k)+ns}'$ can be determined from Expressions (20-1) and (20-2), and a function $g_k(t)$ can be derived from $P_{s(k)}'$, $P_{s(k)}$, and $P_{s(k)+ns}$ already determined upon the previous segment curve creation using Expressions (9), (10), and (11). This is a function that represents a segment curve after creating the first segment curve.

$$\begin{bmatrix} 1 & 0 & 0 & 0 & 0 \\ t_2 & 2(t_1+t_2) & t_1 & 0 & 0 \\ 0 & t_3 & 2(t_2+t_3) & t_2 & 0 \\ 0 & 0 & t_4 & 2(t_3+t_4) & t_3 \\ 0 & 0 & 0 & t_4 & 2t_4 \end{bmatrix} \begin{bmatrix} P_{s(k)}' \\ P_{s(k)+ns}' \\ P_{s(k)+ns+1}' \\ P_{s(k)+ns+2}' \\ P_{s(k)+ns+3}' \end{bmatrix} = \tag{19}$$

$$\begin{bmatrix} P_{s(k)}' \\ \frac{3}{t_1 t_2}(t_1^2(P_{s(k)+ns+1} - P_{s(k)+ns}) + t_2^2(P_{s(k)+ns} - P_{s(k)})) \\ \frac{3}{t_2 t_3}(t_2^2(P_{s(k)+ns+2} - P_{s(k)+ns+1}) + t_3^2(P_{s(k)+ns+1} - P_{s(k)+ns})) \\ \frac{3}{t_3 t_4}(t_3^2(P_{s(k)+ns+3} - P_{s(k)+ns+2}) + t_4^2(P_{s(k)+ns+2} - P_{s(k)+ns+1})) \\ 3(P_{s(k)+ns+3} - P_{s(k)+ns+2}) \end{bmatrix}$$

$$\begin{bmatrix} P_{s(k)}' \\ P_{s(k)+ns}' \\ P_{s(k)+ns+1}' \\ P_{s(k)+ns+2}' \\ P_{s(k)+ns+3}' \end{bmatrix} = \begin{bmatrix} 1 & 0 & 0 & 0 & 0 \\ t_2 & 2(t_1+t_2) & t_1 & 0 & 0 \\ 0 & t_3 & 2(t_2+t_3) & t_2 & 0 \\ 0 & 0 & t_4 & 2(t_3+t_4) & t_3 \\ 0 & 0 & 0 & t_4 & 2t_4 \end{bmatrix}^{-1} * \tag{20-1}$$

$$\begin{bmatrix} P_{s(k)}' \\ \frac{3}{t_1 t_2}(t_1^2(P_{s(k)+ns+1} - P_{s(k)+ns}) + t_2^2(P_{s(k)+ns} - P_{s(k)})) \\ \frac{3}{t_2 t_3}(t_2^2(P_{s(k)+ns+2} - P_{s(k)+ns+1}) + t_3^2(P_{s(k)+ns+1} - P_{s(k)+ns})) \\ \frac{3}{t_3 t_4}(t_3^2(P_{s(k)+ns+3} - P_{s(k)+ns+2}) + t_4^2(P_{s(k)+ns+2} - P_{s(k)+ns+1})) \\ 3(P_{s(k)+ns+3} - P_{s(k)+ns+2}) \end{bmatrix}$$

where $t_1$ to $t_4$ are as defined in Expression (20-2) below.

$$t_1 = \sum_{i=1}^{ns} |P_{s(k)+i} - P_{s(k)+i-1}|, \tag{20-2}$$

$$t_2 = |P_{s(k)+ns+1} - P_{s(k)+ns}|,$$

$$t_3 = |P_{s(k)+ns+2} - P_{s(k)+ns+1}|,$$

$$t_4 = |P_{s(k)+ns+3} - P_{s(k)+ns+3} - P_{s(k)+ns+2}|$$

Since other processes are similar to those in the first embodiment, a description thereof will be omitted.

Next, a third embodiment of a numerical controller with a machining curve creating function according to the present invention will be described.

While a point sequence of command points that are commanded by a machining program has been adopted as a command point sequence in the first and second embodiments, a point sequence produced by performing smoothing on a point sequence of command points that are commanded by a machining program is adopted as the command point sequence in the present third embodiment. Techniques for smoothing are conventional art and the present embodiment combines such smoothing techniques with the present invention.

For example, a simple smoothing method is as follows. With respect to an original point sequence $P_1, \ldots, P_{n-1}$ extracted from a command point sequence commanded by a machining program by excluding a starting point $P_0$ and an ending point $P_n$ thereof, smoothing which averages $P_i$ and two preceding and subsequent points thereof ($P_{i-1}$ and $P_{i+1}$) is performed as represented by Expression (21) below to create a new command point sequence $P_0, P_1, \ldots, P_{n-1}, P_n$.

$$P_i = \frac{P_{i-1} + 2P_i + P_{i+1}}{4} \quad (21)$$

$$(i = 1, 2, ,, n-1)$$

Figure 16:
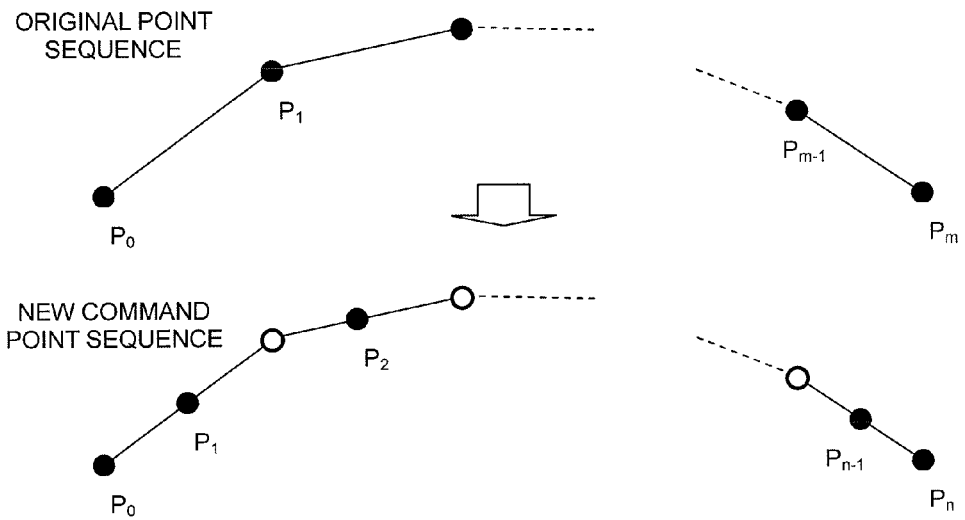
FIG. 16 is a diagram illustrating a method of smoothing.

Alternatively, another simple smoothing method is as described below. With respect to an original point sequence $P_0, P_1, \ldots, P_{m-1}, P_m$ commanded by a machining program, smoothing which creates a midpoint with the exception of a starting point $P_0$ and an ending point $P_m$ thereof is performed as represented by Expression (22) below to create a new command point sequence $P_0, P_1, \ldots, P_{n-1}, P_n$. In this case, since the number of points increases by one compared to the original point sequence $P_0, P_1, \ldots, P_{m-1}, P_m$, n=m+1 is set. In "new command point sequence" shown in a lower half of FIG. 16, the original command point sequence $P_1, \ldots, P_{m-1}$ is represented by outlined dots (○) and the new point sequence $P_0, P_1, \ldots, P_{n-1}, P_n$ is represented by black dots (●).

$$P_i = \frac{P_{i-1} + P_i}{2} \quad (i = 1, 2, ,, m) \quad (22)$$

$$n = m + 1$$

Besides these simple smoothing methods, the present invention can be combined with various smoothing methods known as conventional art.

<Block Diagram>

Figure 17:
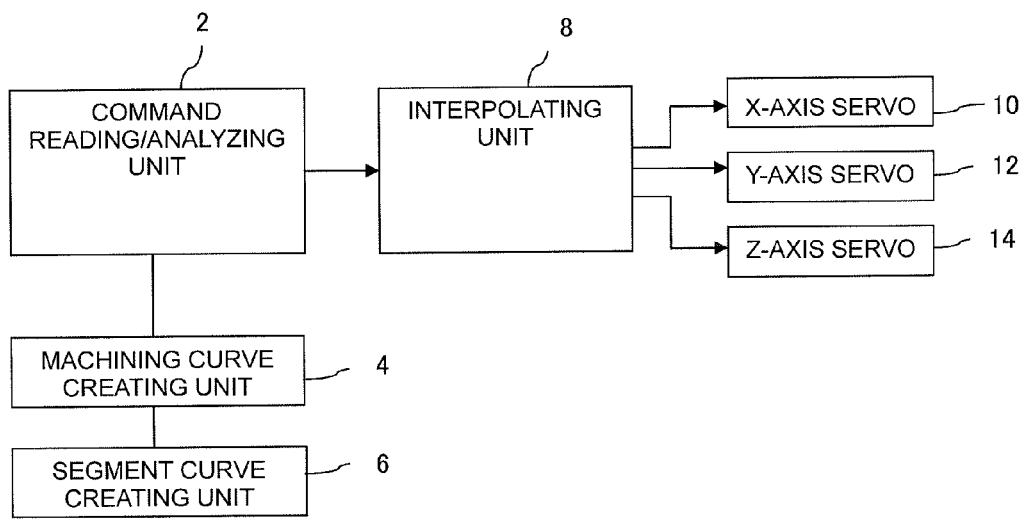
FIG. 17 is a block diagram of a numerical controller with a machining curve creating function according to the present invention.

Next, a first embodiment of the numerical controller according to the present invention will be described with reference to FIG. 17.

The numerical controller performs machining by creating a machining curve that is a curve for machining based on a command point sequence obtained from a machining program for a machine tool having a plurality of drive axes including at least two linear axes, interpolating the machining curve, and driving the drive axes to the interpolated positions on the machining curve. In the numerical controller, a command reading/analyzing unit 2 reads and analyzes commands from the machining program to create interpolation data, an interpolating unit 8 performs interpolation based on the interpolation data and according to a command speed to determine positions to which the respective axes are to be moved, and servos of the respective axes are driven to these positions.

In the present invention, the command reading/analyzing unit 2 reads commands of a machining program and activates a machining curve creating unit 4. The machining curve creating unit 4 activates a segment curve creating unit 6, creates a single segment curve as a machining curve, and sets the segment curve to interpolation data. The segment curve (a part of the machining curve) set to the interpolation data is interpolated by the interpolating unit 8, and the respective drive axes (X, Y, and Z axes servos 10, 12, and 14) are driven to the interpolated positions. The creation of such segment curves, the setting of the segment curves to interpolation data, and the interpolation process thereof are repetitively and consecutively executed. Since techniques used by the interpolating unit 8 to interpolate a machining curve are conventional art, no particular description thereof will be given.

Next, advantageous effects of the present invention will be described. The present invention produces the following advantageous effects.

(1) As described earlier with reference to the block diagram, the numerical controller creates interpolation data with the command reading/analyzing unit and performs interpolation based on the interpolation data with the interpolating unit. When command points with small intervals are commanded, creation of the interpolation data and interpolation based on the interpolation data must be frequently repeated and, as a result, deceleration occurs due to an insufficient capacity for creating and interpolating machining curves. With the present invention, since a cubic curve (segment curve) can be created which corresponds to the maximum number of command points or, in other words, since interpolation data can be created which corresponds to a point sequence that includes the maximum number of command points, there is less possibility that a need arises for frequent repetition of creating interpolation data and performing interpolation. Accordingly, even if intervals between command points are small, occurrences of deceleration due to an insufficient capacity of the numerical controller for creating and interpolating machining curves can be reduced.

(2) Since the present invention enables a cubic curve (segment curve) to be created which corresponds to the maximum number of command points, even if a command point sequence has a variation due to errors with respect to a target curve, the effect of the errors can be reduced and a machining curve that more closely approximates the target curve can be created.

(3) On a machining curve created according to the present invention, first-derivative vectors are continuous and second-derivative vectors are practically continuous at an ending point of each segment curve and at a starting point of a next segment curve. As described earlier, the continuity of second-derivative vectors can be improved by increasing the predetermined number of points nc. In addition, an error of the machining curve from a command point sequence is within a permissible value. Therefore, according to the present invention, a smooth machining shape of which error from the command point sequence is within a permissible value and a smooth machining operation with continuous acceleration of each drive axis can be obtained.

(4) Since the present invention enables machining curves to be sequentially created without reading in all points that constitute the command point sequence, machining curves can be created without needing a large memory or a long computation time.

What is claimed is:

1. A numerical controller with a machining curve creating function which performs machining by creating a machining curve that is a curve for machining based on a command point sequence obtained from a machining program for a machine tool having a plurality of drive axes including at least two linear axes, interpolating the machining curve, and driving the drive axes to the interpolated positions on the machining curve, the numerical controller comprising:

a segment curve creating unit which divides the command point sequence into a plurality of segments, and creates a segment curve that is a curve corresponding to a segment command point sequence of each of the segments, so that a distance of the segment curve from the segment command point sequence is within a permissible value set in advance and a maximum number of command points are included between a segment starting point that is a starting point of the segment command point sequence and a segment ending point that is an ending point of the segment command point sequence; and a machining curve creating unit which creates the machining curve by repetitively executing the process of the segment curve creating unit from a starting point to an ending point of the command point sequence, wherein the machining curve is interpolated and the drive axes are driven so as to move to the interpolated positions on the machining curve.

2. The numerical controller with a machining curve creating function according to claim 1, wherein with respect to a segment command point sequence which is the command point sequence in a segment that starts at the starting point of the command point sequence, the segment curve creating unit:

determines a segment starting point vector and a segment ending point vector, based on the starting point, a starting point condition that is a condition for the starting point, a segment ending point that is an ending point of the segment command point sequence, and a command point sequence constituted by a predetermined number of points after the segment ending point, as first-derivative vectors of the machining curve at the starting point and the segment ending point;

creates the segment curve from the starting point, the segment starting point vector, the segment ending point, and the segment ending point vector;

creates a first segment curve so that a distance of the first segment curve from the segment command point sequence is within a permissible value set in advance and a maximum number of command points are included between the starting point and the segment ending point;

after creating the first segment curve, with respect to a segment command point sequence in a segment subsequent to the command ending point of the command point sequence, sets a segment ending point preceding the segment as a new segment starting point, sets a segment ending point vector preceding the segment as a new segment starting point vector, and sets an ending point of the segment command point sequence as a new segment ending point;

determines a new segment ending point vector as a first-derivative vector of the machining curve at the segment ending point based on the new segment starting point, the new segment starting point vector, the new segment ending point, and a command point sequence constituted by a predetermined number of points after the new segment ending point;

creates the segment curve from the new segment starting point, the new segment starting point vector, the new segment ending point, and the new segment ending point vector; and creates the segment curve so that a distance of the machining curve from the segment command point sequence is within a permissible value set in advance and a maximum number of command points are included between the segment starting point and the segment ending point.

3. The numerical controller with a machining curve creating function according to claim 2, wherein, according to the starting point condition, a tangential direction at a starting point of an arc connecting the starting point, a second point, and a third point of the command point sequence is set as a first-derivative vector of the machining curve, a tangential direction at a starting point of a quadratic curve connecting the starting point, the second point, and the third point of the command point sequence is set as a first-derivative vector of the machining curve, or a tangential direction at a starting point of a straight line connecting the starting point and the second point of the command point sequence is set as a first-derivative vector of the machining curve.

4. The numerical controller with a machining curve creating function according to claim 3, wherein the command point sequence is a point sequence of command points commanded by a machining program or a point sequence produced by performing smoothing on a point sequence of command points commanded by the machining program.

5. The numerical controller with a machining curve creating function according to claim 2, wherein, according to the starting point condition, a second-derivative vector of the machining curve at a starting point of the command point sequence is set to zero.

6. The numerical controller with a machining curve creating function according to claim 5, wherein the command point sequence is a point sequence of command points commanded by a machining program or a point sequence produced by performing smoothing on a point sequence of command points commanded by the machining program.

7. The numerical controller with a machining curve creating function according to claim 2, wherein the command point sequence is a point sequence of command points commanded by a machining program or a point sequence produced by performing smoothing on a point sequence of command points commanded by the machining program.

8. The numerical controller with a machining curve creating function according to claim 1, wherein including the maximum number of command points between the segment starting point and the segment ending point is realized by identifying, while increasing or reducing the number of skips ns, a maximum ns such that all of the following hold:

$$|Q_1 - P_{s(k)+1}| \leq Tol$$

$$|Q_2 - P_{s(k)+2}| \leq Tol$$

$$\ldots$$

$$|Q_{ns-1} - P_{s(k)+ns-1}| \leq Tol.$$

9. The numerical controller with a machining curve creating function according to claim 8, wherein the command point sequence is a point sequence of command points commanded by a machining program or a point sequence produced by performing smoothing on a point sequence of command points commanded by the machining program.

10. The numerical controller with a machining curve creating function according to claim 1, wherein the command point sequence is a point sequence of command points commanded by a machining program or a point sequence produced by performing smoothing on a point sequence of command points commanded by the machining program.

* * * * *